(12) United States Patent
Fujiwara

(10) Patent No.: US 8,647,994 B2
(45) Date of Patent: Feb. 11, 2014

(54) OPTICAL GLASS, GLASS MATERIAL FOR PRESS-MOLDING, AND OPTICAL GLASS ELEMENT

(75) Inventor: Yasuhiro Fujiwara, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 156 days.

(21) Appl. No.: 13/248,875

(22) Filed: Sep. 29, 2011

(65) Prior Publication Data
US 2012/0142516 A1 Jun. 7, 2012

(30) Foreign Application Priority Data

Sep. 30, 2010 (JP) ................ 2010-222345
Dec. 22, 2010 (JP) ................ 2010-285332

(51) Int. Cl.
*C03C 3/16* (2006.01)
*C03C 3/21* (2006.01)
*C03C 3/19* (2006.01)

(52) U.S. Cl.
USPC ............. 501/45; 501/46; 501/47; 501/901; 501/903

(58) Field of Classification Search
USPC ................ 501/45, 46, 47, 901, 903
See application file for complete search history.

(56) References Cited

U.S. PATENT DOCUMENTS

| 8,207,074 | B2 * | 6/2012 | Kitaoka ............ 501/45 |
| 2005/0192174 | A1 * | 9/2005 | Yamamoto et al. ........ 501/45 |
| 2010/0273633 | A1 * | 10/2010 | Kitaoka ............ 501/46 |
| 2012/0238433 | A1 * | 9/2012 | Fujiwara et al. .......... 501/46 |

FOREIGN PATENT DOCUMENTS

| EP | 1 493 720 A1 | 1/2005 |
| EP | 2 543 645 A1 | 1/2013 |
| JP | 2005239476 A | 9/2005 |
| JP | 2006-111499 A | 4/2006 |
| JP | 2007015904 A | 1/2007 |
| JP | 2007-099610 A | 4/2007 |
| JP | 2010275182 A | 12/2010 |
| WO | 2009/001907 A1 | 12/2008 |
| WO | 2010/084922 A1 | 7/2010 |
| WO | 2010/084925 A1 | 7/2010 |

OTHER PUBLICATIONS

International Search Report and Written Opinion corresponding to PCT application No. PCT/JP2011/072610, dated Sep. 30, 2011.
International Preliminary Report on Patentability corresponding to International Application No. PCT/JP2011/072610, dated Apr. 11, 2013.
Extended Search Report issued in corresponding European Patent Application No. 118293687 dated Dec. 11, 2013.

* cited by examiner

*Primary Examiner* — Karl Group
*Assistant Examiner* — Elizabeth A Bolden
(74) *Attorney, Agent, or Firm* — Sughrue Mion, PLLC

(57) ABSTRACT

An optical glass having ultrahigh refractive index and high dispersion characteristics in the form of a refractive index nd exceeding 2.05 and an Abbe number vd of 18.5 or lower and of permitting the stable production of high-quality glass from a glass melt; and a glass material for press molding and an optical element comprised of the optical glass. The optical glass is in the form of an oxide glass and comprises, denoted as cationic percentages: 16 to 35% of $P^{5+}$, 14 to 35% of $Bi^{3+}$, 10 to 33% of $Nb^{5+}$, 0 to 18% of $Ti^{4+}$, and 0 to 20% of $W^{6+}$; the total content of $Bi^{3+}$, $Nb^{5+}$, $Ti^{4+}$, and $W^{6+}$ being 55% or higher; the refractive index and exceeding 2.05; and the Abbe number vd being 18.5 or lower.

10 Claims, 1 Drawing Sheet

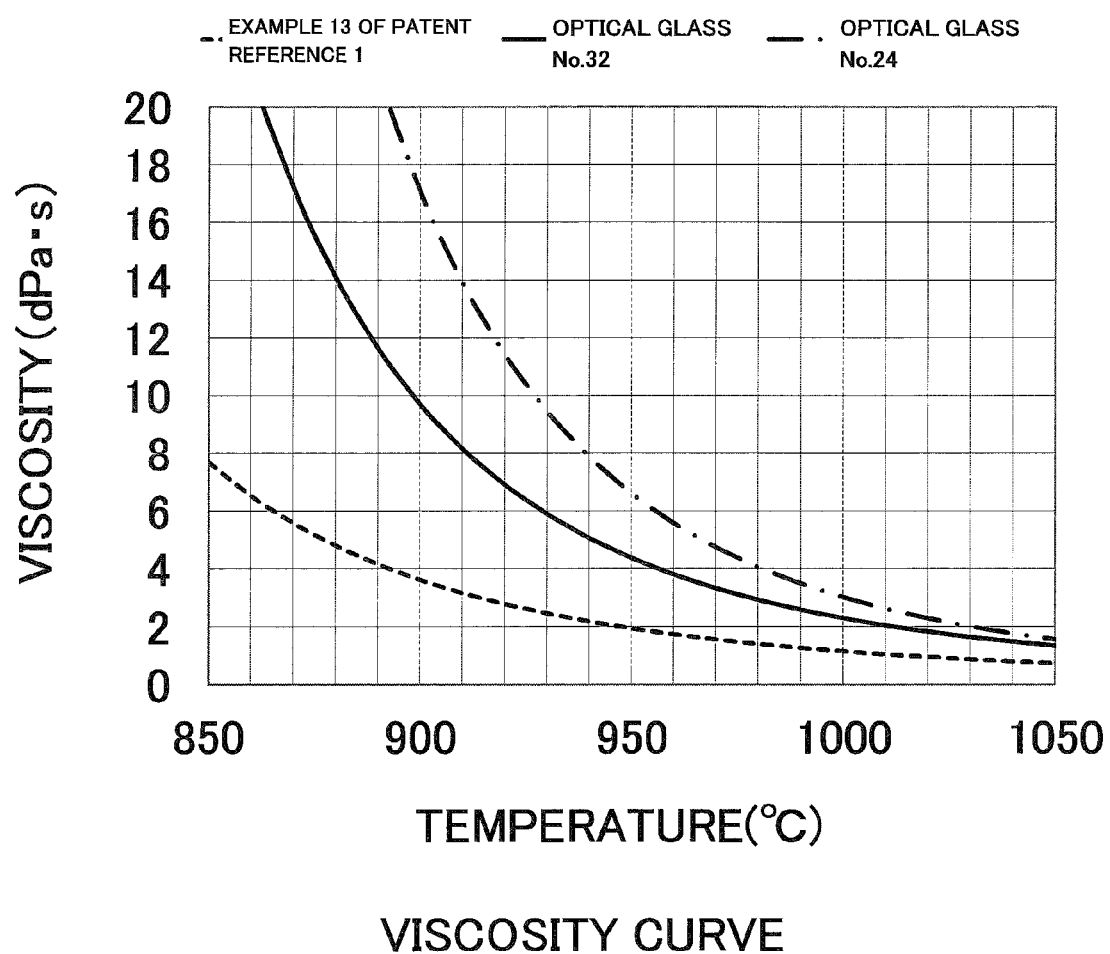
VISCOSITY CURVE

OPTICAL GLASS, GLASS MATERIAL FOR PRESS-MOLDING, AND OPTICAL GLASS ELEMENT

CROSS-REFERENCE TO RELATED PATENT APPLICATIONS

The present invention claims priority under Japanese Patent Application 2010-222345 filed on Sep. 30, 2010 and Japanese Patent Application 2010-285332 filed on Dec. 22, 2010, the entire contents of which are hereby incorporated by reference.

TECHNICAL FIELD

The present invention relates to an optical glass, a glass material for press molding, and an optical element.

BACKGROUND ART

In recent years, as image pickup devices have become more compact, the need for high refractive index, high dispersion lenses has increased. High refractive index, high dispersion optical glasses with bases in the form of the phosphate glasses of the compositions disclosed in Patent Reference 1 (Japanese Unexamined Patent Publication (KOKAI) No. 2006-111499) and Patent Reference 2 (Japanese Unexamined Patent Publication (KOKAI) No. 2007-15904) have been employed as such lens materials.

Ultrahigh refractive index, high dispersion glasses affording refractive indexes exceeding an nd of 2.05 and having an Abbe number of 18.5 or lower are effective for providing high zoom ratio, wide-angle lenses. When classifying the elements necessary for constituting an optical glass of high refractive index from the perspective of the characteristics each element imparts to the glass, it is possible to consider high refractive index, high dispersion elements that impart targeted optical characteristics to the glass, glass network-forming components that promote glass formation but are of low refractive index, and modifying components that enhance the melting property of the glass but are of somewhat low refractive index. Since a large quantity of high refractive index, high dispersion elements such as Bi, Ti, and W must be incorporated as glass components to prepare an ultrahigh refractive index, high dispersion glass, the proportion of network-forming components that promote glass formation and modifying components that enhance the glass melting property is kept relatively low.

As a result, the tendency of the melt comprised of the above elements to crystallize intensifies, the thermal stability of the glass decreases, and the liquidus temperature rises. To prevent devitrification, that is, to prevent crystal precipitation, during the preparation of such a glass, the glass melt molding temperature must be raised, thereby resulting in an extremely low viscosity during molding.

Accordingly, defects such as striae tend to occur during molding, and there are problems in that it becomes difficult to obtain a high-quality glass.

The present invention has as its object to provide an optical glass that solves the above problems, has a high refractive index and high dispersion characteristics in the form of a refractive index nd exceeding 2.05 and an Abbe number vd of 18.5 or lower, and affords viscosity characteristics suited to the preparation of a high-quality glass.

DISCLOSURE OF THE INVENTION

The present invention is as set forth below.
[1] An optical glass in the form of an oxide glass, characterized:
by comprising, denoted as cationic percentages,
16 to 35% of $P^{5+}$,
14 to 35% of $Bi^{3+}$,
0 to 33% of $Nb^{5+}$,
0 to 18% of $Ti^{4+}$, and
0 to 20% of $W^{6+}$;
in that the total content of $Bi^{3+}$, $Nb^{5+}$, $Ti^{4+}$, and $W^{6+}$ is 55% or higher;
the refractive index nd exceeds 2.05; and
the Abbe number vd is 18.5 or lower.
[2] The optical glass according to [1], wherein the viscosity at the liquidus temperature is 1.0 dPa-s or greater.
[3] The optical glass according to [1] or [2], comprising at least one alkali metal component from among $Li^+$, $Na^+$, and $K^+$; the
content of $Li^+$ being 7 cation % or lower,
the content of $Na^+$ being 20 cation % or lower,
the content of $K^+$ being 10 cation % or lower, and
the ratio of the content of $Na^+$ to the total content of $Li^+$, $Na^+$, and $K^+$ ($Na^+/(Li^++Na^++K^+)$) being 0.2 to 1.
[4]
The optical glass according to any one of [1] to [3], wherein the content of $B^{3+}$ is 0 to 20 cation %.
[5] The optical glass of any one of [1] to [4], wherein the total content of $P^{5+}$, $Bi^{3+}$, $Nb^{5+}$, $Ti^{4+}$, $W^{6+}$, $Li^+$, $Na^+$, $K^+$, $Si^{4+}$, $Ba^{2+}$, and $B^{3+}$ is 90 cation % or greater.
[6] The optical glass of any one of [1] to [5], wherein the liquidus temperature is 940° C. or higher.
[7]
A glass material for molding comprised of the optical glass according to any one of [1] to [6].
[8]
An optical element comprised of the optical glass according to any one of [1] to [6].

The present invention provides an optical glass having high refractive index and high dispersion characteristics in the form of a refractive index nd exceeding 2.05 and an Abbe number vd of 18.5 or lower and having viscous characteristics suited to the production of a high-quality glass. The present invention further provides a glass material for press molding and an optical element comprised of the optical glass.

BRIEF DESCRIPTION OF THE DRAWINGS

FIG. 1 is a graph showing the viscosity curves of embodiments of the present invention and an embodiment of Patent Reference 1.

BEST MODES OF CARRYING OUT THE INVENTION

The optical glass of the present invention will be described in detail below.

The optical glass of the present invention is an oxide glass characterized:
by comprising, denoted as cationic percentages,
16 to 35% of $P^{5+}$,
14 to 35% of $Bi^{3+}$,
10 to 33% of $Nb^{5+}$,
0 to 18% of $Ti^{4+}$, and 0 to 20% of $W^{6+}$;
in that the total content of $Bi^{3+}$, $Nb^{5+}$, $Ti^{4+}$, and $W^{6+}$ is 55% or higher;
in that the refractive index nd exceeds 2.05; and
in that the Abbe number vd is 18.5 or lower.

The optical glass of the present invention affords the advantages of having ultrahigh refractive index and high dispersion characteristics in the form of a refractive index nd exceeding 2.05 and an Abbe number vd of 18.5 or lower and of permitting the stable production of high-quality glass from a glass melt.

Further, the optical glass of the present invention is an ultrahigh refractive index, high dispersion glass and affords transmittance characteristics that render it suitable as a material for optical elements employed in the image pickup optical systems of digital image pickup devices.

Conventionally, in the development of the lens materials of light-sensitive film cameras, attention has been directed to finding some way of extending the wavelength region in which high transmittance is achieved into the short wavelength region to obtain good color reproducibility. Generally, in the spectral transmittance characteristics of optical glass, indexes based on specific wavelengths, in the form of k70, which is the wavelength indicating an external transmittance of 70%, and k5, which is the wavelength indicating an external transmittance of 5%, are employed as indexes of the extent to which short wavelengths of light are transmitted.

Generally, in the ultraviolet region of wavelengths of 400 nm or lower, the spectral transmittance of an optical glass decreases the shorter the wavelength being transmitted. Thus, between k70 and k5, the relation of k70>k5 exists. Thus far, the specific wavelengths of most optical glasses have been 400 nm or lower, that is, in the ultraviolet region. Since k70 and k5, which indicate the drop in transmittance, are wavelengths in the ultraviolet region, a drop in the transmittance of visible light presents no problem. However, the greater the dispersion of a glass, the longer the wavelengths of k70 and k5 become. Even among high dispersion glasses, the higher the refractive index, the more pronounced the lengthening of the wavelengths of k70 and k5 becomes. In the development of a high dispersion lens material, that is, the development of a high dispersion optical glass, k70 often falls in the visible range of a wavelength of 400 nm or higher due to the relation k70>k5. As a result, the glass assumes a yellow or brown coloration. Thus, achieving a k70 of shorter wavelength, that is, reducing coloration, has been deemed important. This also applies to the high dispersion lens materials used in digital cameras. Priority is given to shortening the wavelength of k70.

In an ultrahigh refractive index high dispersion glass, compared to medium refractive index and low dispersion glasses, the short wavelength absorption end of the light transmission region becomes a longer wavelength, and $\cancel{3}$5 exists in the visible region in addition to A 70. Thus, to raise the transmittance of visible light, it becomes extremely important to shorten the wavelengths of both A5 and A70. Thus far, in the ultrahigh refractive index high dispersion glasses prepared with the object of reducing coloration, the wavelength of primarily A70 has been shortened, and there has been insufficient shortening of the wavelength of A5. Thus, when employing an image pickup element in which the wavelength of A5 has not been adequately shortened, the threshold wavelength entering the image pickup element lengthens, purple and blue information is dropped from the image information, and color reproducibility deteriorates.

In a digital camera, the image signal can be digitally processed to electronically correct the color balance. Accordingly, even when a certain amount of ordinary wavelength information is dropped, light can be guided into the image pickup element to permit a certain degree of color reproduction while maintaining the ratio of the intensity of light of the three primary colors of red, green, and blue, for example. However, when the transmittance of some portion of light from among the three primary colors drops markedly and the intensity ratio thereof is no longer maintained, it becomes difficult to achieve color reproduction through electronic correction.

Since the optical glass of the present invention has been devised with shortening of the wavelength of A5 in mind, ultrahigh refractive index and high dispersion characteristics can be utilized to achieve an image pickup optical system that is more compact and affords greater functionality while maintaining good color reproducibility. The shortening of the wavelength of A5 will be described further below.

[The Glass Composition]

The optical glass of the present invention is an oxide glass with a main anion component in the form of $O_2^-$. The $O_2^-$ content can be thought of with 90 to 100 anion % as a yardstick. When the $O_2^-$ content falls within this range, other anion components such as $F^-$, $Cl^-$, $Br^-$, $I^-$, $S^{2-}$, $Se^{2-}$, $N^{3-}$, $NO_3^-$, and $SO_4^{2-}$ can also be incorporated. In that case, the total content of $F^-$, $Cl^-$, $Br^-$, $I^-$, $S^{2-}$, $Se^{2-}$, $N^{3-}$, $NO_3^-$, and $SO_4^-$ may be, for example 0 to 10 anion %. The content of $O_2^-$ can also be 100 anion %.

The cation components will be described next. Unless specifically stated otherwise, the content and total content of the cation components are denoted as cationic percentages.

$P^{5+}$ is a glass network-forming component. It is an essential component in the optical glass of the present invention. It has the effect of enhancing the thermal stability of the glass, and functions to lower the liquidus temperature, raise the viscosity at the liquidus temperature, and facilitate the production of a high-quality optical glass. When the content of $P^{5+}$ is less than 16%, it becomes difficult to achieve the above effects. When the $P^{5+}$ content exceeds 35%, the refractive index drops and the crystallization of the glass tends to increase. Thus, the $P^{5+}$ content is set at 16 to 35%. The lower limit of the $P^{5+}$ content is desirably 18%, preferably 20%, more preferably 22%, still more preferably 24%, and yet still more preferably, 26%. The upper limit of the $P^{5+}$ content is desirably 31%, preferably 30%, more preferably 29%, and still more preferably, 28%.

The high refractive index and high dispersion components will be described next. The high refractive index and high dispersion components of an optical glass present problems such as lowering the viscosity during glass manufacturing and increasing the wavelengths at the absorption ends of the spectral transmittance characteristics, as set forth above. There is an additional problem of increasing the density of the glass.

In recent years, lenses such as image pickup lenses, particularly lenses mounted in portable image pickup devices, vehicle-mounted camera lenses, and pickup lenses, have tended to decrease in size. In such lenses, it is necessary to reduce the shift in focus position in reading media, image pickup elements such as CCDs, and the like. Thus, the respective modules are equipped with various vibrationisolating mechanisms and designed so that the frequencies of the various vibrations do not exceed the primary resonance points F0 (Hz) obtained from the resonance frequencies of the modules.

The primary resonance point F0 is inversely proportional to the square root ~m of the mass m of the module. Thus, the greater the weight of the module, the smaller F0 becomes, requiring the addition of a vibration-isolating mechanism, which is undesirable.

A camera lens is precisely driven by an actuator or the like. Increasing the mass of the drive element is undesirable in that it increases the load that is applied to the mechanism when driving and positioning the mechanism, and increases power consumption.

Given the above background, in the course of achieving an ultrahigh refractive index in an optical element, it is necessary to inhibit any increase in the density of the optical glass serving as the material. In practical terms, the density is proportional to the specific gravity of the glass when gravitational acceleration is deemed to be constant. Thus, to inhibit an increase in the density of the glass, it suffices to inhibit an increase in the specific gravity of the glass at a given gravitational acceleration.

Accordingly, what elements to employ as refractive index-raising and dispersion-raising components and the relative proportions of the various components are desirably determined taking into account the manufacturing stability, transmittance characteristics, density, and specific gravity of the glass.

It is necessary to increase the molecular refraction of the glass to increase the refractive index of the glass. Among ions, highly polarizable anions, that is, oxygen ions and fluorine ions, determine the molecular refraction of the glass. (The optical glass of the present invention is an oxide glass, and as such, the anions are primarily oxygen ions.) The molecular refraction increases in proportion to the fill rate of anions. Thus, increasing the fill rate of these anions is effective. The fill rate of the anions is determined by such factors as the disposition of outer shell electrons, coordination number, valence, and the ionic radius of the cations that bond with the anions. Accordingly, the disposition of outer shell electrons, coordination number, valence, ionic radius of the cations, and the like affect the refractive index.

For example, since Ta and Nb are of higher valence than La, which is a typical high refractive index component of optical glass, substituting Ta or Nb for La raises the refractive index. W is an effective component for raising the refractive index that has a higher valence than Ta. The valence of Bi is identical to that of La, but its intrinsic polarizing property is high. Thus, it contributes to raising the refractive index and its effect on raising the refractive index per unit cation % is greater than that of Nb and W.

Ti is an element with inadequate oxygen ion filling relative to Ta and Nb. However, it absorbs certain wavelengths strongly (ultraviolet absorption) and thus raises the refractive index at certain wavelengths (for example, the refractive index in the blue to violet region, known as the f ray and g ray refractive index). Since Ti atoms are of low mass, they have a substantial effect on raising the refractive index without raising the density of the glass.

Although not on the level of Ti, Nb has a mass that is lower than that of W and Bi. Thus, it is a component that raises the refractive index without increasing the density of the glass. When incorporated into a glass, it exhibits ultraviolet absorption at a specific wavelength, making it a component that can increase dispersion and raise the refractive index at a specific wavelength. Nb is of greater mass than Ti, making it somewhat disadvantageous from the perspective of inhibiting an increase in density. However, it is advantageous in terms of obtaining good transmittance characteristics.

Further, Bi, Nb, Ti, and W lower the liquidus temperature and increase the stability of the glass when present together as glass components, thereby contributing to improving manufacturing stability.

Such points were comprehensively taken into account in establishing the contents of refractive index-increasing components as set forth below.

$Bi^{3+}$ is an essential component for obtaining a high refractive index, high dispersion glass. The incorporation of a suitable quantity functions to enhance the thermal stability of the glass. It also serves to change the polarity of the glass. When the content of $Bi^{3+}$ is less than 14%, it becomes difficult to achieve these effects. When the $Bi^{3+}$ content exceeds 35%, the thermal stability drops, the liquidus temperature rises, and the viscosity at the liquidus temperature tends to decrease, which are undesirable for obtaining a high-quality optical glass. The glass also assumes a brown coloration and the wavelengths at the absorption ends of the spectral transmittance characteristics increase. Accordingly, the content of $Bi^{3+}$ is 14 to 35%. The lower limit of the $Bi^{3+}$ content is desirably 16%, preferably 18%, more preferably 20%, still more preferably 22%, yet still more preferably 23%, and even more preferably, 24%. The upper limit of the $Bi^{3+}$ content is desirably 32%, preferably 30%, more preferably 28%, still more preferably 27%, yet still more preferably 25%, even more preferably 24%, yet even more preferably 23%, and yet still even more preferably, 22%.

$Nb^{3+}$ is an essential component that functions to raise the refractive index and increase the dispersion of the glass. It also serves to maintain the thermal stability of the glass when $Bi^{3+}$ and $Ti^{4+}$ are present together, to increase the chemical durability of the glass, and to enhance the mechanical strength of the glass. When the content of $Nb^{3+}$ is less than 10%, it becomes difficult to achieve the desired high refractive index and high dispersion characteristics while maintaining thermal stability. When the content of $Nb^{3+}$ exceeds 33%, the thermal stability of the glass drops, the liquidus temperature rises precipitously, and the viscosity at the liquidus temperature drops, making it hard to produce a high-quality optical glass. Although not to the extent of Bi3+, $Ti^{4+}$, and $W^{6+}$, the wavelengths at the absorption ends of the spectral transmittance characteristics tend to increase to some extent. Accordingly, the content of $Nb^{5+}$ is set to 10 to 33%. The lower limit of the $Nb^{5+}$ content is desirably 12%, preferably 14%, more preferably 16%, still more preferably 17%, yet still more preferably 18%, and even more preferably, 19%. The upper limit of the $Nb^{5+}$ content is desirably 30%, preferably 27%, more preferably 25%, still more preferably 24%, yet more preferably 23%, and yet still more preferably, 22%. Among the high refractive index and high dispersion components of $Bi^{3+}$, $Nb^{5+}$, $Ti^{4+}$, and $W^{6+}$, $Nb^{5+}$ is the component that has the greatest tendency not to increase the wavelengths at the absorption ends of the spectral transmittance characteristics.

$Ti^{4+}$ is an optional element that functions to raise the refractive index and dispersion of the glass and to maintain the thermal stability of the glass when present with $Bi^{3+}$ and $Nb^{5+}$. Accordingly, the content can be 0%. It also functions to increase the chemical durability of the glass as well as the mechanical strength of the glass. When the content of $Ti^{4+}$ exceeds 18%, the thermal stability decreases, crystallization tends to increase, the liquidus temperature increases markedly, and the viscosity at the liquidus temperature decreases, making it difficult to produce a high-quality optical glass. Further, the wavelengths at the absorption ends of the spectral transmittance characteristics increase and the glass tends to develop a brown coloration. Accordingly, the $Ti^{4+}$ content is 0 to 18%. The upper limit of the $Ti^{4+}$ content is desirably 15%, preferably 13%, more preferably 12%, still more preferably 11%, and yet still more preferably, 10%, The lower limit of the $Ti^{4+}$ content is desirably 3%, preferably 5%, more preferably 6%, still more preferably 7%, and yet still more preferably 8%.

$W^{6+}$ is an optional component that functions to raise the refractive index and dispersion of the glass and increase the chemical durability and mechanical strength of the glass. Accordingly, the content can be 0%. When the content of $W^{6+}$ exceeds 20%, the thermal stability of the glass drops, the liquidus temperature tends to rise, and the viscosity at the liquidus temperature drops, making it difficult to obtain a highquality optical glass. Further, the glass exhibits a bluish-gray coloration and the wavelengths at the absorption ends of the spectral transmittance characteristics increase. Accordingly, the content of $W^{6+}$ is 0 to 20%. The upper limit of the W6+ content is desirably 18%, preferably 15%, more preferably 12%, still more preferably 10%, yet still more preferably 8, and even more preferably, 6%. The lower limit is desirably 2%, preferably 3%, and more preferably, 4%.

To obtain an optical glass of desired high refractive index and high dispersion, in addition to the individual contents of $Bi^{3+}$, $Nb^{5+}$, $Ti^{4+}$, and $W^{6+}$ falling into the abovestated ranges, the total content of $Bi^{3+}$, $Nb^{5+}$, $Ti^{4+}$, and $W^{6+}$ is greater than or equal to 55%. The lower limit of the total content of $Bi^{3+}$, $Nb^{5+}$, $Ti^{4+}$, and $W^{6+}$ is desirably 57%, preferably 58%, more preferably 60%, still more preferably 62%, yet still more preferably 63%, even more preferably 64%, and even yet more preferably, 65%. From the perspective of maintaining the stability of the glass while imparting a melting property to the glass starting materials, the upper limit of the total content of Bi3+, Nb5+, $Ti^{4+}$, and $W^{6+}$ is desirably 90%, preferably 80%, and more preferably, 70%.

From the perspectives of raising the refractive index relative to the density of the glass, reducing the Abbe number of the glass at a given refractive index to enhance the high dispersion characteristics, and inhibiting a drop in the viscosity at the liquidus temperature of the glass, the ratio of the content of $Ti^{4+}$ to the total content of $Bi^{3+}$, $Nb^{5+}$, $Ti^{4+}$, and $W^{6+}$ ($Ti^{4+}/Bi^{3+}+Nb^{5+}+Ti^{4+}+W^{6+}$) is desirably kept to 0.03 to 0.33. When this ratio drops below 0.03, the refractive index per unit density of the glass decreases and the high dispersion characteristic decreases. Thus, the liquidus temperature of the glass rises and the viscosity tends to drop. When this ratio exceeds 0.33, the melting property of the glass deteriorates markedly, the stability of the glass decreases, and the viscosity at the liquidus temperature tends to drop. The lower limit of the ratio ($Ti^{4+}/Bi^{3+}+Nb^{5+}+Ti^{4+}+W^{6+}$) is desirably 0.05, preferably 0.10, more preferably 0.13, still more preferably 0.15, yet still more preferably 0.16, and even more preferably, 0.17. The upper limit is desirably 0.33, preferably 0.30, more preferably 0.25, still more preferably 0.22, and yet still more preferably, 0.20.

Other optional components will be described next. The contents of the various optional components employed in the present invention can be 0%, or can exceed 0%.

$Li^+$ functions to enhance the melting property, to lower the melting temperature, to shorten the wavelengths at the absorption ends of the spectral transmission characteristics, to inhibit reduction of the above refractive index-raising components in the glass melt, and to inhibit coloration. However, it also lowers the thermal stability of the glass and the viscosity at the liquidus temperature. When the content of $Li^+$ exceeds 7%, the refractive index drops and the thermal stability and viscosity at the liquidus temperature tend to drop. Thus, the content of $Li^+$ is desirably kept to 0 to 7%. The $Li^+$ content desirably falls within a range of 0 to 5%, preferably falls within a range of 0 to 4%, more preferably falls within a range of 0 to 3%, still more preferably falls within a range of 0 to 2%, and yet still more preferably, falls within a range of 0 to 1%. It is also possible for none to be incorporated. Compared to other alkali components in the form of $Na^+$ and $K^+$, the ionic radius of $Li^+$ is small. Thus, due to the tightening effect of the glass structure, the function of lowering the refractive index is relatively weak among the alkali components.

$Na^+$ functions to improve the melting property without greatly compromising the thermal stability of the glass, lower the melting temperature, shorten the wavelengths at the absorption ends of the spectral transmittance characteristics, inhibit reduction of the above refractive index-raising components in the glass melt, and inhibit coloration. Further, although it somewhat lowers the viscosity at the liquidus temperature, it functions to lower the liquidus temperature. However, when the content of Na+ exceeds 20%, the refractive index drops and the thermal stability and viscosity at the liquidus temperature tend to drop. Thus, the $Na^+$ content is desirably kept to 0 to 20%. The upper limit of the $Na^+$ content is desirably 18%, 16%, 14%, 12%, 10%, 8%, 7%, 6%, and 5%, in descending order. The upper limit is optimally 4%. Since the ionic radius of $Na^+$ lies between that of $Li^+$ and $K^+$, the function of lowering the refractive index is greater than that of $Li^+$ and less than that of K+.

The lower limit of the $Na^+$ content is desirably 0.1%, preferably 0.5%, more preferably 1%, still more preferably 2%, and yet still more preferably, 3%.

$K^+$ functions to improve the melting property and lower the melting temperature. It also serves to shorten the wavelengths at the absorption ends of the spectral transmittance characteristics, inhibit reduction of the above refractive index-raising components in the glass melt, and inhibit coloration. It functions better than $Li^+$ and Na+ to enhance thermal stability and lower the liquidus temperature. However, when the K+ content exceeds 10%, the refractive index drops and the thermal stability and viscosity at the liquidus temperature tend to decrease. Thus, the content of $K^+$ is desirably kept to 0 to 10%. The upper limit of the $K^+$ content is preferably 7%, more preferably 5%, still more preferably 4%, yet still more preferably 3%, even more preferably 2%, and yet even more preferably, 1%. It is possible to incorporate none.

In terms of inhibiting a drop in the viscosity at the liquidus temperature and inhibiting coloration of the glass due to reduction of refractive index-raising components, the total content of $Li^+$, $Na^+$, and $K^+$ is desirably kept to within a range of 0 to 20%. The upper limit of the total content of $Li^+$, $Na^+$, and $K^+$ is desirably 15%, preferably 12%, more preferably 10%, still more preferably 7%, yet still more preferably 5%, even more preferably 4%, and yet even more preferably, 3%. When shortening the wavelengths at the absorption ends of the spectral transmittance characteristics and inhibiting coloration due to the reduction of refractive index-raising components are priorities, it is desirable to incorporate alkali components within the above ranges. In that case, the lower limit of the total quantity of $Li^+$, $Na^+$, and $K^+$ is desirably 1%, preferably 2%. When neither $Li^+$, $Na^+$, nor $K^+$ is being incorporated, to shorten the wavelengths at the absorption ends and enhance viscosity, it is desirable to incorporate $B^{3+}$ and/or an alkaline earth metal component. It is possible to incorporate $B^{3+}$ and/or an alkaline earth metal component even when incorporating an alkali component. The content of $B^{3+}$ is set forth further below.

Alkali components and alkaline earth metal components function to cleavage covalent bonds such as . . . O—P—O—

Nb—O . . . and replace them with the likes of . . . O—P—ONa to terminate a covalent bond on the end, thereby lowering the melt viscosity. The degree of termination on the end in the structure of a glass can be roughly denoted by the product of the number of moles of modifying components multiplied by the valence. The lower this value is, the greater the increase in the viscosity of the glass at a given temperature in a molten state. Accordingly, the total quantity of alkali components and alkaline earth metal components (R2O+RO), where R2O is the total quantity of alkali metal components based on oxides and RO is the total quantity of alkaline earth metal components) is desirably 20 mole % or lower, preferably 15 mole % or lower, more preferably 13 mole % or lower, still more preferably 11 mole % or lower, still more preferably 10 mole % or lower, still more preferably 8 mole % or lower, still more preferably 6 mole % or lower, still more preferably 4 mole % or lower, and yet still more preferably, 3 mole % or lower. The total quantity of alkali metal components and alkaline earth metal components based on oxides can also be 0 mole %. However, when the total quantity of alkali metal components and alkaline earth metal components is excessively low, it becomes difficult to inhibit coloration due to the reduction of readily reducing ions such as Ti, Nb, Bi, and W. Thus, the total quantity of alkali metal components and alkaline earth metal components based on oxides is desirably 0.5 mole % or greater, preferably 1 mole %, and more preferably, 2 mole % or greater.

Introducing an alkali component enhances the melting property, enhances spectral transmittance characteristics, and inhibits coloration of the glass. Thus, it is desirable to incorporate at least one alkali metal component from among $Li^+$, $Na^+$, and $K^+$. In that case, considering the effects of $Li^+$, $Na^+$, and $K^+$ on the stability and viscosity at the liquidus temperature of the glass, and the magnitude of their effects on the refractive index, to adjust the stability, liquid phase viscosity, and optical characteristics of the glass to conform to the object of the present invention, the content of $Li^+$ is 7% or less, the content of $Na^+$ is 20% or less, and the content of $K^+$ is 10% or less, and the ratio of the content of $Na^+$ to the total content of $Li^+$, $Na^+$, and $K^+$ ($Na^+/(Li^++Na^++K^+)$) is desirably kept to 0.2 to 1. The ratio ($Na^+/(Li^++Na^++K^+)$) preferably falls within a range of 0.5 to 1, more preferably falls within a range of 0.7 to 1, still more preferably falls within a range of 0.8 to 1, still more preferably falls within a range of 0.85 to 1, still more preferably falls within a range of 0.9 to 1, still more preferably falls within a range of 0.95 to 1, and can be 1.

$B^{3+}$ functions to enhance the thermal stability of the glass, lower the liquidus temperature, and increase the viscosity at the liquidus temperature when incorporated in a suitable quantity. However, when the content of $B^{3+}$ exceeds 20%, the refractive index drops, the thermal stability drops, the liquidus temperature rises, and coloration of the glass tends to increase. Thus, the content of $B^{3+}$ is desirably kept to 0 to 20%. The lower limit of the content of $B^{3+}$ is desirably 1%, preferably 2%, more preferably 3%, still more preferably 4%, and yet still more preferably 5%. The upper limit of the content of $B^{3+}$ is desirably 18%, preferably 16%, more preferably 14%, still more preferably 13%, yet still more preferably 12%, even more preferably 10%, even still more preferably 9%, yet even still more preferably 8%, and optimally, 7%.

$Si^{4+}$ functions to considerably raise the liquid phase viscosity of the glass while lowering the refractive index. However, the introduction of an excessive quantity tends to raise the liquidus temperature of the glass or cause phase separation of the glass. Thus, the upper limit of the content of $Si^{4+}$ is desirably 5%, preferably 3%, more preferably 2%, and still more preferably, 1.5%. The lower limit of the $Si^{4+}$ content is desirably 0%, preferably greater than 0%, more preferably 0.5%, still more preferably 0.8%, and yet still more preferably, 1%. $Si^{4+}$ is principally introduced as an ordinary oxide starting material. However, SiO2 can also be caused to mix in from a crucible made of a material consisting primarily of SiO2.

$Ba^{2+}$ functions to improve the thermal stability of the glass, raise the viscosity at the liquidus temperature, enhance the melting property, shorten the wavelengths at the absorption ends of the spectral transmittance characteristics, and inhibit coloration of the glass due to the reduction of refractive index-raising components. However, when the content of $Ba^{2+}$ is excessive (exceeds 15%), the refractive index drops, the Abbe number greatly increases, and it becomes difficult to achieve the desired optical characteristics. Thus, the content of $Ba^{2+}$ desirably falls within a range of 0 to 15%.

The upper limit of the $Ba^{2+}$ content is desirably 12%, preferably 9%, more preferably 6%, still more preferably 0 to 4%, and yet still more preferably, 0 to 3%. The lower limit of the $Ba^{2+}$ content is desirably 0%, preferably 0.2%, more preferably 0.5%, still more preferably 1.0%, and yet still more preferably, 2.0%. From the perspective of optical characteristics, it is possible not to incorporate any Ba2+.

To inhibit a drop in viscosity at the liquidus temperature while maintaining a refractive index nd exceeding 2.05, the total content of $P^{5+}$, $Bi^{3+}$, $Nb^{5+}$, $Ti^{4+}$, $W^{s+}$, Li+, $Na^+$, $K^+$, $B^{3+}$, $Si^{4+}$, and $Ba^{2+}$ is desirably 90 to 100%, preferably 95 to 100%, more preferably 98 to 100%, and still more preferably, 99 to 100%. The total content can be 100%.

From the same perspective, the total content of $P^{5+}$, $Bi^{3+}$, $Nb^{5+}$, $Ti^{4+}$, $W^{s+}$, Li+, $Na^+$, $K^+$, $B^{3+}$ and $Si^{4+}$ is desirably 90 to 100%, preferably 95 to 100%, more preferably 98 to 100%, and still more preferably, 99 to 100%. The total content can be 100%.

Components that can be incorporated in addition to the above cation components are: $Sr^{2+}$, $Ca^{2+}$, $Mg^{2+}$, $Zn^{2+}$, $Al^{3+}$ and the like. Of these, each of $Sr^{2+}$, $Ca^{2+}$, $Mg^{2+}$ and $Zn^{2+}$ functions to enhance the melting property of the glass, but lowers the refractive index. Thus, the content of each of $Sr^{2+}$, $Ca^{2+}$, $Mg^{2+}$ and $Zn^{2+}$ desirably falls within a range of 0 to 5%, preferably falls within a range of 0 to 3%, more preferably falls within a range of 0 to 2%, and still more preferably, falls within a range of 0 to 1%. It is possible not to incorporate any $Sr^{2+}$, $Ca^{2+}$, $Mg^{2+}$ or $Zn^{2+}$.

$Al^{3+}$ functions to lower the refractive index and raise the liquidus temperature of the glass. Thus, the content of $Al^{3+}$ desirably falls within a range of 0 to 5%, preferably falls within a range of 0 to 3%, more preferably falls within a range of 0 to 2%, and still more preferably, falls within a range of 0 to 1%. It is possible not to incorporate any $Al^{3+}$.

Clarifying agents such as $Sb_2O_3$ and $SnO_2$ can be added as additives. Various salts comprised of anions such as $NO^{3-}$, $CO^{3-}$, $SO_4^{2-}$, F−, Cl−, Br−, and I− and their counter ions in the form of cations can also be added.

Among the above clarifying agents, $Sb_2O_3$ is preferred. When employing $Sb_2O_3$, the quantity of $Sb_2O_3$ that is added as a mass ratio based on the total amount of the glass 14 components desirably falls within a range of 0 to 10,000 ppm. The "mass ratio based on the total amount of the glass components" is the quantity added denoted as a ratio based on the mass of the glass components. In addition to having a clarifying effect, $Sb_2O_3$ functions to keep the above-described refractive index-raising components in an oxidized state and stabilizes the oxidized state. However, when the quantity added as a mass ratio based on the total amount of the glass components exceeds 10,000 ppm, the absorption of light by Sb itself tends to cause coloration of the glass. From the perspective of enhancing the transmittance characteristic of the glass, the upper limit of the quantity of $Sb_2O_3$ added based on the total amount of the glass components is desirably 5,000 ppm, preferably 2,000 ppm, more preferably 1,100 ppm, still more preferably 900 ppm, and yet still more preferably, 600 ppm. The lower limit is desirably 100 ppm, preferably 200 ppm, and more preferably, 300 ppm. Since Sb is an additive, the quantity added is denoted as the value converted to the oxide, in contrast to glass components.

In the optical glass of the present invention, cations of Pb, As, Cd, Te, Tl, and Se are desirably not incorporated or added in consideration of the load they place on the environment. Cations of V, Cr, Mn, Fe, Co, Ni, Cu, Pr, Nd, Eu, Tb, Ho, and Er discolor the glass and generate fluorescence when irradiated with ultraviolet radiation, and are thus desirably not incorporated or added. However, their non-incorporation or non-addition does not extend to excluding their being mixing in as impurities originating in the glass starting materials or the glass melting step.

Trace quantities of $Ga^{3+}$, $Lu^{3+}$, $In^{3+}$, $Ge^{4+}$, and $Hf^{4+}$ can be contained. However, these components do not produce significant effects and are expensive. Thus, the content of each is desirably kept to within a range of 0 to 2%, preferably 0 to 1%, more preferably 0 to less than 0.5%, and still more preferably, 0 to less than 0.1%. They are desirably not incorporated so as to reduce the cost of manufacturing the glass.

[The Refractive Index and Abbe Number]

The refractive index of the optical glass of the present invention exceeds 2.05 and the Abbe number vd is 18.5 or lower. Thus, the optical glass of the present invention has an ultrahigh refractive index and high dispersion, making it suitable as a material for optical elements for constituting high zoom ratio, wide-angle, compact optical systems. The viscosity at the liquidus temperature tends to reduce by the increase of the refractive index nd and reduction of the Abbe number Ȟd. Thus the upper limit of the refractive index nd and the lower limit of the Abbe number vd are not specifically limited so long as the viscosity at the liquidus temperature is 1 dPa-s or greater within the above-stated glass composition range. However, an upper limit of 3.0 can be used as a yardstick for the refractive index nd and a lower limit of 5 can be used as a yardstick for the Abbe number.

From the perspective of providing an optical glass that can be used in optical elements that more effectively increase the functionality and compactness of optical systems, the lower limit of the refractive index nd is desirably 2.06, preferably 2.07, more preferably 2.08, and still more preferably 2.09. The upper limit of the Abbe number Ȟd is desirably 18.1, preferably 17.7, more preferably 17.4, still more preferably 17.2, and yet still more preferably, 17.1

[The Liquidus Temperature and Viscosity at the Liquidus Temperature]

The viscosity of the optical glass of the present invention at the liquidus temperature is 1 dPa-s or more. The liquidus temperature tends to rise as the refractive index and dispersion of the glass increase, and can easily reach an elevated temperature of 940° C. or more. A rise in the liquidus temperature causes a rise in the melting temperature and molding temperature by preventing devitrification during glass manufacturing. As a result, the viscosity of the glass during molding drops precipitously, striae are produced, and optical homogeneity ends up deteriorating markedly. The present invention raises the viscosity value per unit temperature, even when the liquidus temperature rises with increases in the refractive index and dispersion, thereby maintaining a viscosity at the liquidus temperature of 1 dPa-s or higher, inhibiting the formation of striae, and providing a high-quality optical glass of good optical homogeneity.

In the present invention, the viscosity at the liquidus temperature desirably falls within a range of 1.0 dPa-s or higher, preferably falls within a range of 1.4 dPa-s or higher, more preferably falls within a range of 1.7 dPa-s or higher, still more preferably falls within a range of 2.0 dPa-s or higher, yet still more preferably falls within a range of 2.2 dPa-s or higher, even more preferably falls within a range of 2.5 dPa-s or higher, even still more preferably falls within a range of 2.7 dPa-s or higher, yet even still more preferably falls within a range of 3.0 dPa-s or higher, and optimally falls within a range of 3.2 dPa-s or higher. The upper limit of the viscosity at the liquidus temperature is not specifically limited, but 20 dPa-s can be considered as a yardstick. However, there is a risk of the refractive index dropping when the viscosity at the liquidus temperature becomes excessively high. Thus, the upper limit of the viscosity at the liquidus temperature is desirably 10 dPa-s, preferably 5 dPa-s.

The liquidus temperature in the present invention falls within a range of 1,100° C. and below. By keeping the liquidus temperature within this range, it is possible to inhibit excessive rises in the melting temperature and molding temperature, to prevent the material of the crucible from melting out and discoloring the glass during glass manufacturing, and to prevent the material of the crucible from mixing into the glass as an impurity and compromising the quality of the glass. It is also possible to inhibit volatization from the glass melt, and to inhibit changes in composition and variation in optical characteristics due to volatization. From the perspective of incorporating numerous refractive index-raising components with high melting temperatures, a lower limit of the liquidus temperature of 800° C. or higher, preferably 900° C. or higher, can be thought of as a yardstick. As set forth above, 940° C. can also be thought of as a yardstick.

In the present invention, the specific gravity is defined as the specific gravity of the glass obtained at a gradual cooling rate of –30° C./hour. The amount of change in the specific gravity relative to the cooling rate is as follows. The amount of increase in the specific gravity when the cooling rate is reduced to ⅒ is 0.005 to 0.06%, preferably 0.01 to 0.04%. Thus, based on the cooling rate of the glass, it can be thought of as adjusting the numeric range given below to a cooling rate of –30° C./hour. The upper limit of the specific gravity is desirably 6.0, preferably 5.7, more preferably 5.5, still more preferably 5.4, and yet still more preferably, 5.3. The lower limit is not specifically limited. However, when the specific gravity is excessively low, there is a risk that the refractive index will drop. Thus, the lower limit of the specific gravity is desirably 3.0, preferably 4.0, more preferably 4.5, still more preferably 4.8, and yet still more preferably, 5.0.

[Method of Manufacturing the Optical Glass]

The optical glass of the present invention can be manufacturing by a melting method.

For example, starting material compounds corresponding to the various components are weighed out so as to yield a glass of desired composition and thoroughly mixed to prepare a starting material blend. The starting material blend is then charged to a crucible and melted for 0.5 to 4 hours while being stirred at 1,100 to 1,200° C. Subsequently, the glass melt is caused to flow into a prescribed vessel, cooled, and pulverized to obtain cullets.

The cullets are then charged to a crucible made of a noble metal, heated to between the liquidus temperature LT and 1,200° C., stirred, and melted. The glass melt is then clarified for 0.5 to 6 hours at between the liquidus temperature LT and 1,200° C. Following clarification, the temperature of the glass is lowered from the clarification temperature to between the liquidus temperature Lt and 1,100° C., desirably between the liquidus temperature LT and 1,080° C., preferably to between the liquidus temperature LT and 1,050° C., more preferably to between the liquidus temperature LT and 1,020° C., and still more preferably, to between the liquidus temperature Lt and 1,000° C. The glass melt is then made to flow out through a pipe connected to the bottom portion of the crucible, or cast, into a casting mold and molded to obtain optical glass.

The above temperature conditions and time required for each step can be suitably adjusted.

Multiple types of cullets having different optical characteristics can also be prepared by the above method, these cullets can be blended to obtain desired optical characteristics, and the blend can be melted, clarified, and molded to prepare an optical glass.

[The Glass Material for Press Molding]

The glass material for press molding of the present invention (referred to hereinafter as the "glass material") is comprised of the above-described optical glass of the present invention. At first, the glass material is prepared by heating, melting, and molding glass starting materials that have been blended to obtain the optical glass of the present invention. The molded glass member thus prepared is processed to prepare a glass material corresponding to the weight of one press-molded article. Methods other than this one can also be applied, such as known methods of preparing glass materials for press molding.

[The Optical Element]

The optical element of the present invention is comprised of the optical glass of the present invention.

Specific examples are lenses such as aspherical lenses, spherical lenses, plano-concave lenses, plano-convex lenses, biconcave lenses, biconvex lenses, convex meniscus lenses, and concave meniscus lenses; various lenses such as microlenses, lens arrays, and lenses with diffraction gratings; prisms; and prisms with lens functions. Antireflective films, partial reflective films with wavelength-selecting portions, and the like can be provided on the surfaces thereof as needed.

The optical element of the present invention is comprised of a glass with ultrahigh refractive index and high dispersion characteristics. Thus, good chromatic aberration correction can be achieved through combination with optical elements comprised of other glasses.

The optical element of the present invention is also effective in terms of achieving higher zoom ratios, wider angles, and greater compactness in image pickup optical systems.

Still further, a glass of ultrahigh refractive index and high dispersion characteristics, in which an increase in specific gravity has been inhibited, is employed in the optical element of the present invention, permitting weight reduction of the optical element and effectively preventing a shift in the focus position due to vibration.

The use of a glass in which the wavelengths at the absorption ends of the spectral transmittance characteristics have been shortened makes it possible to prevent the dropping of image information in the visible short-wavelength region and effectively enhances the ability to reproduce colors of digital image pickup devices.

The optical element of the present invention is suited to the image pickup optical systems of various cameras, such as digital still cameras, digital video cameras, monitor cameras, and vehicle-mounted cameras; optical elements directing light rays to read data from and write data to optical recording media such as DVDs and CDs; and, for example, optical pickup lenses and collimating lenses. It is also suitable as an optical element for optical communication.

The above optical element can be manufactured by the method of processing the optical glass of the present invention and polishing the surface thereof; the method of heating and press molding the glass material for press molding of the present invention to manufacture an optical material blank and grinding and polishing the optical element blank; the method of heating and precision press molding the glass material for press molding of the present invention to obtain an optical element, and other known methods.

EMBODIMENTS

The present invention will be described in greater detail below through embodiments.

Embodiment 1

Starting material compounds corresponding to various components were weighed out to constitute glasses having the compositions of nos. 1 to 44 shown in Table 1 and thoroughly mixed to obtain blended starting materials. The glass compositions shown in Table 1 are based on values indicating cationic percentages. Values denoting mole percentages and weight percentages have all been converted to cationic percentages.

Each blended starting material was then charged to a crucible and melted for 2 to 5 hours while being stirred at 1,100 to 1,200° C., rapidly cooled, and pulverized to obtain cullets.

The cullets were then charged to a crucible made of a noble metal, heated to between 1,000 and 1,100° C., stirred, and melted. Next, the glass melt was clarified for 2 to 6 hours at 1,000 to 1,100° C. Following clarification, the temperature of the glass was lowered from the clarification temperature to between the liquidus temperature LT and 1,050° C., the glass melt was caused to flow out through a pipe connected to the bottom portion of the crucible or cast into a casting mold, and glass blocks were molded.

Light rays were directed onto the various glass blocks that were obtained and the optical path of the light rays in the glass was observed from the side. No foreign matter such as crystals was found in the glass, indicating that highly homogeneous, high-quality optical glasses had been obtained.

Optical glass nos. 1 to 44 that had been obtained were measured as set forth below to determine the refractive index nd, Abbe number vd, liquidus temperature, viscosity at the liquidus temperature, glass transition temperature, specific gravity, ,k70, and, k5. An empty space indicates that no measurement was made.

(1) The Refractive Index nd and Abbe Number vd

Measurements were made based on standard JOGIS-01 of the Japan Optical Glass Industry Society. The results are given in Table 1.

(2) The Liquidus Temperature LT and Viscosity at the Liquidus Temperature

The glass sample was placed in a furnace that had been heated to a prescribed temperature, kept there for 2 hours, and then cooled. The interior of the glass was then observed by optical microscopy at 100-fold magnification and the liquidus temperature was determined based on the presence or absence of crystals. The viscosity was measured by a viscosity measurement method employing a coaxial double cylinder rotational viscometer according to JIS viscosity standard Z8803.

(3) The Glass Transition Temperature Tg

The glass transition temperature was measured from the endothermic curve when the glass was heated while in a solid state with a DSC3300SA differential scanning calorimeter. The Tg obtained by this measurement correlates to the Tg as measured by standard JOGIS-08 of the Japan Optical Glass Industry Society. The measurement results are given in Table 1.

(4) The Specific Gravity

Measured in accordance with standard JOGIS-05 of the Japan Optical Glass Industry Society. The results are given in Table 1.

(5), k70 and, k5

,k70 and, k5 were measured as follows. A glass sample 10 mm in thickness having mutually parallel, optically polished flat surfaces was employed to measure the spectral transmittance in wavelength regions from wavelengths of 280 nm to 700 nm. Light rays of intensity A were directed perpendicularly onto one of the optically polished flat surfaces and the intensity B of the light rays exiting from the other flat surface was measured. The spectral transmittance was calculated as B/A. Accordingly, the reflection loss of the light rays on the surface of the sample was included in the spectral transmittance. The wavelength with a spectral transmittance of 70% was adopted as, k70, and the wavelength with a spectral transmittance of 5% was adopted as, k5. The measurement results are given in Table 1.

TABLE 1

| | | No. 1 | | | No. 2 | | |
|---|---|---|---|---|---|---|---|
| | | cation % | mole % | mass % | cation % | mole % | mass % |
| Cation component (expressed in oxide) | $P^{5+}$ ($P_2O_5$) | 29.87 | 26.000 | 16.070 | 29.87 | 26.000 | 16.510 |
| | $Bi^{3+}$ ($Bi_2O_3$) | 22.99 | 20.000 | 40.590 | 22.99 | 20.000 | 41.700 |
| | $Nb^{5+}$ ($Nb_2O_5$) | 22.99 | 20.000 | 23.160 | 22.99 | 20.000 | 23.800 |
| | $Ti^{4+}$ ($TiO_2$) | 6.90 | 12.000 | 4.180 | 9.20 | 16.000 | 5.720 |
| | $W^{6+}$ ($WO_3$) | 6.90 | 12.000 | 12.120 | 4.60 | 8.000 | 8.300 |
| | $Li^+$ ($Li_2O$) | 0.00 | 0.000 | 0.000 | 0.00 | 0.000 | 0.000 |
| | $Na^+$ ($Na_2O$) | 3.45 | 3.000 | 0.810 | 3.45 | 3.000 | 0.830 |
| | $K^+$ ($K_2O$) | 2.30 | 2.000 | 0.820 | 2.30 | 2.000 | 0.840 |
| | $B^{3+}$ ($B_2O_3$) | 3.45 | 3.000 | 0.910 | 3.45 | 3.000 | 0.930 |
| | $Ba^{2+}$ (BaO) | 1.15 | 2.000 | 1.340 | 1.15 | 2.000 | 1.370 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 59.78 | 64.000 | 80.050 | 59.78 | 64.000 | 79.520 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.115 | 0.188 | 0.052 | 0.154 | 0.250 | 0.072 |
| | $Li^+ + Na^+ + K^+$ ($Li_2O + Na_2O + K_2O$) | 5.75 | 5.000 | 1.630 | 5.75 | 5.000 | 1.670 |
| | $Na^+/(Li^+ + Na^+ + K^+)$ ($Na_2O/(Li_2O + Na_2O + K_2O)$) | 0.60 | 0.600 | 0.497 | 0.600 | 0.600 | 0.497 |
| | $R_2O + RO$ | 6.90 | 7.000 | 2.970 | 6.90 | 7.000 | 3.040 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 98.85 | 98.000 | 98.660 | 98.85 | 98.000 | 98.630 |
| Anion component | $O^{2-}$ | | 100 anion % | | | 100 anion % | |
| | Refractive index nd | | 2.05452 | | | 2.05895 | |
| | Abbé number vd | | 17.81 | | | 17.69 | |
| | Liquidus temperature [° C.] | | 1000 | | | 1000 | |
| | Glass transition temperature [° C.] | | 553 | | | 558.5 | |

TABLE 1-continued

|  |  | 5.19 | 5.12 |
|---|---|---|---|
| Specific gravity |  | 5.19 | 5.12 |
| Viscosity at liquidus temperature [dPa·s] |  | 1.6 | 1.6 |
| $\lambda 5$ [nm] |  | 414 | 416 |
| $\lambda 70$ [nm] |  | 530 | 533 |

| | | No. 3 | | | No. 4 | | |
|---|---|---|---|---|---|---|---|
| | | cation % | mole % | mass % | cation % | mole % | mass % |
| Cation component (expressed in oxide) | $P^{5+}$ ($P_2O_5$) | 28.92 | 25.000 | 15.530 | 25.00 | 21.740 | 13.440 |
| | $Bi^{3+}$ ($Bi_2O_3$) | 24.10 | 20.830 | 42.470 | 25.00 | 21.740 | 44.110 |
| | $Nb^{5+}$ ($Nb_2O_5$) | 24.10 | 20.830 | 24.230 | 25.00 | 21.740 | 25.160 |
| | $Ti^{4+}$ ($TiO_2$) | 9.64 | 16.670 | 5.830 | 10.00 | 17.390 | 6.050 |
| | $W^{6+}$ ($WO_3$) | 4.82 | 8.340 | 8.450 | 5.00 | 8.700 | 8.780 |
| | $Li^+$ ($Li_2O$) | 0.00 | 0.000 | 0.000 | 0.00 | 0.000 | 0.000 |
| | $Na^+$ ($Na_2O$) | 1.20 | 1.040 | 0.280 | 6.25 | 5.430 | 1.470 |
| | $K^+$ ($K_2O$) | 2.41 | 2.080 | 0.860 | 0.00 | 0.000 | 0.000 |
| | $B^{3+}$ ($B_2O_3$) | 3.61 | 3.130 | 0.950 | 3.75 | 3.260 | 0.990 |
| | $Ba^{2+}$ (BaO) | 1.20 | 2.080 | 1.400 | 0.00 | 0.000 | 0.000 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 62.66 | 66.670 | 80.980 | 65.00 | 69.570 | 84.100 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.154 | 0.250 | 0.072 | 0.154 | 0.250 | 0.072 |
| | $Li^+ + Na^+ + K^+$ ($Li_2O + Na_2O + K_2O$) | 3.61 | 3.120 | 1.140 | 6.25 | 5.430 | 1.470 |
| | $Na^+/(Li^+ + Na^+ + K^+)$ ($Na_2O/(Li_2O + Na_2O + K_2O)$) | 0.332 | 0.333 | 0.246 | 1.000 | 1.000 | 1.000 |
| | $R_2O + RO$ | 4.81 | 5.200 | 2.540 | 6.25 | 5.430 | 1.470 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 98.80 | 97.920 | 98.600 | 100.00 | 100.000 | 100.000 |
| Anion component | $O^{2-}$ | | 100 anion % | | | 100 anion % | |
| | Refractive index nd | | 2.08022 | | | 2.11798 | |
| | Abbé number vd | | 17.36 | | | 16.7 | |
| | Liquidus temperature [° C.] | | 1010 | | | 1040 | |
| | Glass transition temperature [° C.] | | 566.2 | | | 551.1 | |
| | Specific gravity | | 5.2 | | | 5.34 | |
| | Viscosity at liquidus temperature [dPa·s] | | 1.4 | | | 1.2 | |
| | $\lambda 5$ [nm] | | 419 | | | 426 | |
| | $\lambda 70$ [nm] | | 564 | | | 586 | |

TABLE 1-continued

| | | No. 5 | | | No. 6 | | |
|---|---|---|---|---|---|---|---|
| | | cation % | mole % | mass % | cation % | mole % | mass % |
| Cation component (expressed in oxide) | $P^{5+}$ ($P_2O_5$) | 25.00 | 21.740 | 13.420 | 25.00 | 22.520 | 13.240 |
| | $Bi^{3+}$ ($Bi_2O_3$) | 25.00 | 21.740 | 44.050 | 25.00 | 22.520 | 43.460 |
| | $Nb^{5+}$ ($Nb_2O_5$) | 25.00 | 21.740 | 25.130 | 29.00 | 26.130 | 28.760 |
| | $Ti^{4+}$ ($TiO_2$) | 10.00 | 17.390 | 6.040 | 6.00 | 10.810 | 3.580 |
| | $W^{6+}$ ($WO_3$) | 5.00 | 8.700 | 8.770 | 5.00 | 9.010 | 8.650 |
| | $Li^+$ ($Li_2O$) | 0.00 | 0.000 | 0.000 | 0.00 | 0.000 | 0.000 |
| | $Na^+$ ($Na_2O$) | 1.25 | 1.090 | 0.290 | 10.00 | 9.010 | 2.310 |
| | $K^+$ ($K_2O$) | 0.00 | 0.000 | 0.000 | 0.00 | 0.000 | 0.000 |
| | $B^{3+}$ ($B_2O_3$) | 8.75 | 7.600 | 2.300 | 0.00 | 0.000 | 0.000 |
| | $Ba^{2+}$ (BaO) | 0.00 | 0.000 | 0.000 | 0.00 | 0.000 | 0.000 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 65.00 | 69.570 | 83.990 | 65.00 | 68.470 | 84.450 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.154 | 0.250 | 0.072 | 0.092 | 0.158 | 0.042 |
| | $Li^+ + Na^+ + K^+$ ($Li_2O + Na_2O + K_2O$) | 1.25 | 1.090 | 0.290 | 10.00 | 9.010 | 2.310 |
| | $Na^+/(Li^+ + Na^+ + K^+)$ ($Na_2O/(Li_2O + Na_2O + K_2O)$) | 1.000 | 1.000 | 1.000 | 1.000 | 1.000 | 1.000 |
| | $R_2O + RO$ | 1.25 | 1.090 | 0.290 | 10.00 | 9.010 | 2.310 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.000 | 100.000 | 100.00 | 100.000 | 100.000 |
| Anion component | $O^{2-}$ | | 100 anion % | | | 100 anion % | |
| | Refractive index nd | | 2.11404 | | | 2.1161 | |
| | Abbé number vd | | 16.88 | | | 16.76 | |
| | Liquidus temperature [° C.] | | 1040 | | | 1040 | |
| | Glass transition temperature [° C.] | | 550.6 | | | 556.1 | |
| | Specific gravity | | 5.30 | | | 5.39 | |
| | Viscosity at liquidus temperature [dPa·s] | | 1.2 | | | 1.2 | |
| | λ5 [nm] | | 422 | | | 428 | |
| | λ70 [nm] | | 559 | | | 612 | |

| | | No. 7 | | | No. 8 | | |
|---|---|---|---|---|---|---|---|
| | | cation % | mole % | mass % | cation % | mole % | mass % |
| Cation component (expressed in oxide) | $P^{5+}$ ($P_2O_5$) | 25.00 | 23.590 | 13.230 | 25.00 | 21.740 | 13.320 |
| | $Bi^{3+}$ ($Bi_2O_3$) | 30.00 | 28.300 | 52.140 | 25.00 | 21.740 | 43.730 |
| | $Nb^{5+}$ ($Nb_2O_5$) | 29.00 | 27.360 | 28.750 | 25.00 | 21.740 | 24.950 |
| | $Ti^{4+}$ ($TiO_2$) | 6.00 | 11.320 | 3.570 | 10.00 | 17.380 | 6.000 |

TABLE 1-continued

| | | cation % | mole % | mass % | cation % | mole % | mass % |
|---|---|---|---|---|---|---|---|
| | $W^{6+}$ ($WO_3$) | 0.00 | 0.000 | 0.000 | 5.00 | 8.700 | 8.700 |
| | $Li^+$ ($Li_2O$) | 0.00 | 0.000 | 0.000 | 0.00 | 0.000 | 0.000 |
| | $Na^+$ ($Na_2O$) | 10.00 | 9.430 | 2.310 | 2.00 | 1.740 | 0.470 |
| | $K^+$ ($K_2O$) | 0.00 | 0.000 | 0.000 | 8.00 | 6.960 | 2.830 |
| | $B^{3+}$ ($B_2O_3$) | 0.00 | 0.000 | 0.000 | 0.00 | 0.000 | 0.000 |
| | $Ba^{2+}$ (BaO) | 0.00 | 0.000 | 0.000 | 0.00 | 0.000 | 0.000 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 65.00 | 66.980 | 84.460 | 65.00 | 69.560 | 83.380 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.092 | 0.169 | 0.042 | 0.154 | 0.250 | 0.072 |
| | $Li^+ + Na^+ + K^+$ ($Li_2O + Na_2O + K_2O$) | 10.00 | 9.430 | 2.310 | 10.00 | 8.700 | 3.300 |
| | $Na^+/(Li^+ + Na^+ + K^+)$ ($Na_2O/(Li_2O + Na_2O + K_2O)$) | 1.000 | 1.000 | 1.000 | 0.200 | 0.200 | 0.142 |
| | $R_2O + RO$ | 10.00 | 9.430 | 2.310 | 10.00 | 8.700 | 3.300 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.000 | 100.000 | 100.00 | 100.000 | 100.000 |
| Anion component | $O^{2-}$ | | 100 anion % | | | 100 anion % | |
| | Refractive index nd | | 2.12996 | | | 2.10482 | |
| | Abbé number vd | | 16.83 | | | 16.6 | |
| | Liquidus temperature [° C.] | | 1040 | | | 1040 | |
| | Glass transition temperature [° C.] | | 554.7 | | | 567.3 | |
| | Specific gravity | | 5.51 | | | 5.29 | |
| | Viscosity at liquidus temperature [dPa · s] | | 1.2 | | | 1.4 | |
| | λ5 [nm] | | 420 | | | 426 | |
| | λ70 [nm] | | 613 | | | 546 | |

| | | No. 9 | | | No. 10 | | |
|---|---|---|---|---|---|---|---|
| | | cation % | mole % | mass % | cation % | mole % | mass % |
| Cation component (expressed in oxide) | $P^{5+}$ ($P_2O_5$) | 25.00 | 21.740 | 13.490 | 25.00 | 20.330 | 12.520 |
| | $Bi^{3+}$ ($Bi_2O_3$) | 25.00 | 21.740 | 44.270 | 25.00 | 20.330 | 41.110 |
| | $Nb^{5+}$ ($Nb_2O_5$) | 25.00 | 21.740 | 25.250 | 25.00 | 20.330 | 23.450 |
| | $Ti^{4+}$ ($TiO_2$) | 10.00 | 17.380 | 6.070 | 10.00 | 16.250 | 5.640 |
| | $W^{6+}$ ($WO_3$) | 5.00 | 8.700 | 8.810 | 5.00 | 8.120 | 8.180 |
| | $Li^+$ ($Li_2O$) | 2.00 | 1.740 | 0.230 | 0.00 | 0.000 | 0.000 |
| | $Na^+$ ($Na_2O$) | 8.00 | 6.960 | 1.880 | 2.00 | 1.630 | 0.440 |
| | $K^+$ ($K_2O$) | 0.00 | 0.000 | 0.000 | 0.00 | 0.000 | 0.000 |
| | $B^{3+}$ ($B_2O_3$) | 0.00 | 0.000 | 0.000 | 0.00 | 0.000 | 0.000 |
| | $Ba^{2+}$ (BaO) | 0.00 | 0.000 | 0.000 | 8.00 | 13.010 | 8.660 |
| | $Sr^{2+}$ (SrO) | 0.00 | 0.000 | 0.000 | 0.00 | 0.000 | 0.000 |

TABLE 1-continued

|  |  | | | | | | |
|---|---|---|---|---|---|---|---|
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 65.00 | 69.560 | 84.400 | 65.00 | 65.030 | 78.380 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.154 | 0.250 | 0.072 | 0.154 | 0.250 | 0.072 |
| | $Li^+ + Na^+ + K^+$ ($Li_2O + Na_2O + K_2O$) | 10.00 | 8.700 | 2.110 | 2.00 | 1.630 | 0.440 |
| | $Na^+/(Li^+ + Na^+ + K^+)$ ($Na_2O/(Li_2O + Na_2O + K_2O)$) | 0.800 | 0.800 | 0.891 | 1.000 | 1.000 | 1.000 |
| | $R_2O + RO$ | 10.00 | 8.700 | 2.110 | 10.00 | 14.640 | 9.100 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.000 | 100.000 | 92.00 | 86.990 | 91.340 |
| Anion component | $O^{2-}$ | | 100 anion % | | | 100 anion % | |
| | Refractive index nd | | 2.12476 | | | 2.12026 | |
| | Abbé number vd | | 16.53 | | | 17.12 | |
| | Liquidus temperature [° C.] | | 1040 | | | 1040 | |
| | Glass transition temperature [° C.] | | 552 | | | 583 | |
| | Specific gravity | | 5.37 | | | 5.58 | |
| | Viscosity at liquidus temperature [dPa · s] | | 1.2 | | | 1.4 | |
| | λ5 [nm] | | 431 | | | 427 | |
| | λ70 [nm] | | 568 | | | 546 | |

| | | No. | | | | | |
|---|---|---|---|---|---|---|---|
| | | 11 | | | 12 | | |
| | | cation % | mole % | mass % | cation % | mole % | mass % |
| Cation component (expressed in oxide) | $P^{5+}$ ($P_2O_5$) | 25.00 | 21.740 | 13.720 | 27.50 | 23.900 | 15.580 |
| | $Bi^{3+}$ ($Bi_2O_3$) | 25.00 | 21.740 | 45.030 | 22.50 | 19.570 | 41.830 |
| | $Nb^{5+}$ ($Nb_2O_5$) | 22.50 | 19.560 | 23.120 | 22.50 | 19.570 | 23.870 |
| | $Ti^{4+}$ ($TiO_2$) | 10.00 | 17.390 | 6.180 | 10.00 | 17.390 | 6.380 |
| | $W^{6+}$ ($WO_3$) | 5.00 | 8.700 | 8.960 | 5.00 | 8.700 | 9.250 |
| | $Li^+$ ($Li_2O$) | 0.00 | 0.000 | 0.000 | 0.00 | 0.000 | 0.000 |
| | $Na^+$ ($Na_2O$) | 12.50 | 10.870 | 2.990 | 12.50 | 10.870 | 3.090 |
| | $K^+$ ($K_2O$) | 0.00 | 0.000 | 0.000 | 0.00 | 0.000 | 0.000 |
| | $B^{3+}$ ($B_2O_3$) | 0.00 | 0.000 | 0.000 | 0.00 | 0.000 | 0.000 |
| | $Ba^{2+}$ (BaO) | 0.00 | 0.000 | 0.000 | 0.00 | 0.000 | 0.000 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 62.50 | 67.390 | 83.290 | 60.00 | 65.230 | 81.330 |

TABLE 1-continued

| | | | | | | | |
|---|---|---|---|---|---|---|---|
| | Ti$^{4+}$/(Bi$^{3+}$ + Nb$^{5+}$ + Ti$^{4+}$ + W$^{6+}$) (TiO$_2$/(Bi$_2$O$_3$ + Nb$_2$O$_5$ + TiO$_2$ + WO$_3$)) | 0.160 | 0.258 | 0.074 | 0.167 | 0.267 | 0.078 |
| | Li$^+$ + Na$^+$ + K$^+$ (Li$_2$O + Na$_2$O + K$_2$O) | 12.50 | 10.870 | 2.990 | 12.50 | 10.870 | 3.090 |
| | Na$^+$/(Li$^+$ + Na$^+$ + K$^+$) (Na$_2$O/(Li$_2$O + Na$_2$O + K$_2$O)) | 1.000 | 1.000 | 1.000 | 1.000 | 1.000 | 1.000 |
| | R$_2$O + RO | 12.50 | 10.870 | 2.990 | 12.50 | 10.870 | 3.090 |
| | P$^{5+}$ + Bi$^{3+}$ + Nb$^{5+}$ + Ti$^{4+}$ + W$^{6+}$ + Li$^+$ + Na$^+$ + K$^+$ + B$^{3+}$ + Si$^{4+}$ + Ba$^{2+}$ (P$_2$O$_5$ + Bi$_2$O$_3$ + Nb$_2$O$_5$ + TiO$_2$ + WO$_3$ + Li$_2$O + Na$_2$O + K$_2$O + B$_2$O$_3$ + SiO$_2$ + BaO) | 100.00 | 100.000 | 100.000 | 100.00 | 100.000 | 100.000 |
| | P$^{5+}$ + Bi$^{3+}$ + Nb$^{5+}$ + Ti$^{4+}$ + W$^{6+}$ + Li$^+$ + Na$^+$ + K$^+$ + Si$^{4+}$ + B$^{3+}$ (P$_2$O$_5$ + Bi$_2$O$_3$ + Nb$_2$O$_5$ + TiO$_2$ + WO$_3$ + Li$_2$O + Na$_2$O + K$_2$O + SiO$_2$ + B$_2$O$_3$) | 100.00 | 100.000 | 100.000 | 100.00 | 100.000 | 100.000 |
| Anion component | O$^{2-}$ | | 100 anion % | | | 100 anion % | |
| | Refractive index nd | | 2.10414 | | | 2.07469 | |
| | Abbé number vd | | 16.74 | | | 17.16 | |
| | Liquidus temperature [° C.] | | 1010 | | | 990 | |
| | Glass transition temperature [° C.] | | 547.6 | | | 555.4 | |
| | Specific gravity | | 5.36 | | | 5.15 | |
| | Viscosity at liquidus temperature [dPa · s] | | 1.4 | | | 1.9 | |
| | λ5 [nm] | | 425 | | | 414 | |
| | λ70 [nm] | | 543 | | | 524 | |

| | | No. | | | | | |
|---|---|---|---|---|---|---|---|
| | | 13 | | | 14 | | |
| | | cation % | mole % | mass % | cation % | mole % | mass % |
| Cation component (expressed in oxide) | P$^{5+}$ (P$_2$O$_5$) | 25.00 | 21.280 | 14.730 | 27.50 | 23.404 | 15.548 |
| | Bi$^{3+}$ (Bi$_2$O$_3$) | 20.00 | 17.020 | 38.680 | 22.50 | 19.149 | 41.759 |
| | Nb$^{5+}$ (Nb$_2$O$_5$) | 22.50 | 19.150 | 24.820 | 22.50 | 19.149 | 23.822 |
| | Ti$^{4+}$ (TiO$_2$) | 12.50 | 21.270 | 8.290 | 10.00 | 17.021 | 6.364 |
| | W$^{6+}$ (WO$_3$) | 5.00 | 8.510 | 9.620 | 5.00 | 8.511 | 9.235 |
| | Li$^+$ (Li$_2$O) | 0.00 | 0.000 | 0.000 | 0.00 | 0.000 | 0.000 |
| | Na$^+$ (Na$_2$O) | 15.00 | 12.770 | 3.860 | 10.00 | 8.511 | 2.469 |
| | K$^+$ (K$_2$O) | 0.00 | 0.000 | 0.000 | 0.00 | 0.000 | 0.000 |
| | B$^{3+}$ (B$_2$O$_3$) | 0.00 | 0.000 | 0.000 | 0.00 | 0.000 | 0.000 |
| | Ba$^{2+}$ (BaO) | 0.00 | 0.000 | 0.000 | 0.00 | 0.000 | 0.000 |
| | Sr$^{2+}$ (SrO) | 0.00 | 0.000 | 0.000 | 0.00 | 0.000 | 0.000 |
| | Ca$^{2+}$ (CaO) | 0.00 | 0.000 | 0.000 | 0.00 | 0.000 | 0.000 |
| | Mg$^{2+}$ (MgO) | 0.00 | 0.000 | 0.000 | 2.50 | 4.255 | 0.803 |
| | Si$^{4+}$ (SiO$_2$) | 0.00 | 0.000 | 0.000 | 0.00 | 0.000 | 0.000 |
| | Zr$^{4+}$ (ZrO$_2$) | 0.00 | 0.000 | 0.000 | 0.00 | 0.000 | 0.000 |
| | Total | 100.00 | 100.000 | 100.000 | 100.00 | 100.000 | 100.000 |
| | Sb$_2$O$_3$ (Remarks 2) | — | — | 0.1 | — | — | 0.1 |
| | Bi$^{3+}$ + Nb$^{5+}$ + Ti$^{4+}$ + W$^{6+}$ (Bi$_2$O$_3$ + Nb$_2$O$_5$ + TiO$_2$ + WO$_3$) | 60.00 | 65.950 | 81.410 | 60.00 | 63.830 | 81.180 |
| | Ti$^{4+}$/(Bi$^{3+}$ + Nb$^{5+}$ + Ti$^{4+}$ + W$^{6+}$) (TiO$_2$/(Bi$_2$O$_3$ + Nb$_2$O$_5$ + TiO$_2$ + WO$_3$)) | 0.208 | 0.323 | 0.102 | 0.167 | 0.267 | 0.078 |
| | Li$^+$ + Na$^+$ + K$^+$ (Li$_2$O + Na$_2$O + K$_2$O) | 15.00 | 12.770 | 3.860 | 10.00 | 8.511 | 2.469 |
| | Na$^+$/(Li$^+$ + Na$^+$ + K$^+$) (Na$_2$O/(Li$_2$O + Na$_2$O + K$_2$O)) | 1.000 | 1.000 | 1.000 | 1.000 | 1.000 | 1.000 |
| | R$_2$O + RO | 15.00 | 12.770 | 3.860 | 12.50 | 12.766 | 3.272 |
| | P$^{5+}$ + Bi$^{3+}$ + Nb$^{5+}$ + Ti$^{4+}$ + W$^{6+}$ + Li$^+$ + Na$^+$ + K$^+$ + B$^{3+}$ + Si$^{4+}$ + Ba$^{2+}$ (P$_2$O$_5$ + Bi$_2$O$_3$ + Nb$_2$O$_5$ + TiO$_2$ + WO$_3$ + Li$_2$O + Na$_2$O + K$_2$O + B$_2$O$_3$ + SiO$_2$ + BaO) | 100.00 | 100.000 | 100.000 | 97.50 | 95.745 | 99.197 |
| | P$^{5+}$ + Bi$^{3+}$ + Nb$^{5+}$ + Ti$^{4+}$ + W$^{6+}$ + Li$^+$ + Na$^+$ + K$^+$ + Si$^{4+}$ + B$^{3+}$ (P$_2$O$_5$ + Bi$_2$O$_3$ + Nb$_2$O$_5$ + TiO$_2$ + WO$_3$ + Li$_2$O + Na$_2$O + K$_2$O + SiO$_2$ + B$_2$O$_3$) | 100.00 | 100.000 | 100.000 | 97.50 | 95.745 | 99.197 |

TABLE 1-continued

| | | | |
|---|---|---|---|
| Anion component | $O^{2-}$ | 100 anion % | 100 anion % |
| | Refractive index nd | 2.08294 | 2.07779 |
| | Abbé number vd | 16.79 | 17.23 |
| | Liquidus temperature [° C.] | 1040 | 1030 |
| | Glass transition temperature [° C.] | 556.2 | 556 |
| | Specific gravity | 5.06 | 5.18 |
| | Viscosity at liquidus temperature [dPa·s] | 1.2 | 1.3 |
| | $\lambda 5$ [nm] | 424 | 428 |
| | $\lambda 70$ [nm] | 544 | 565 |

| | | No. 15 | | | No. 16 | | |
|---|---|---|---|---|---|---|---|
| | | cation % | mole % | mass % | cation % | mole % | mass % |
| Cation component (expressed in oxide) | $P^{5+}$ ($P_2O_5$) | 27.50 | 23.404 | 15.500 | 27.50 | 23.404 | 15.355 |
| | $Bi^{3+}$ ($Bi_2O_3$) | 22.50 | 19.149 | 41.628 | 22.50 | 19.149 | 41.239 |
| | $Nb^{5+}$ ($Nb_2O_5$) | 22.50 | 19.149 | 23.748 | 22.50 | 19.149 | 23.526 |
| | $Ti^{4+}$ ($TiO_2$) | 10.00 | 17.021 | 6.344 | 10.00 | 17.021 | 6.284 |
| | $W^{6+}$ ($WO_3$) | 5.00 | 8.511 | 9.206 | 5.00 | 8.511 | 9.120 |
| | $Li^+$ ($Li_2O$) | 0.00 | 0.000 | 0.000 | 0.00 | 0.000 | 0.000 |
| | $Na^+$ ($Na_2O$) | 10.00 | 8.511 | 2.461 | 10.00 | 8.511 | 2.438 |
| | $K^+$ ($K_2O$) | 0.00 | 0.000 | 0.000 | 0.00 | 0.000 | 0.000 |
| | $B^{3+}$ ($B_2O_3$) | 0.00 | 0.000 | 0.000 | 0.00 | 0.000 | 0.000 |
| | $Ba^{2+}$ (BaO) | 0.00 | 0.000 | 0.000 | 0.00 | 0.000 | 0.000 |
| | $Sr^{2+}$ (SrO) | 0.00 | 0.000 | 0.000 | 2.50 | 4.255 | 2.038 |
| | $Ca^{2+}$ (CaO) | 2.50 | 4.255 | 1.113 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 60.00 | 63.830 | 80.926 | 60.00 | 63.830 | 80.169 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.167 | 0.267 | 0.078 | 0.167 | 0.267 | 0.078 |
| | $Li^+ + Na^+ + K^+$ ($Li_2O + Na_2O + K_2O$) | 10.00 | 8.511 | 2.461 | 10.00 | 8.511 | 2.438 |
| | $Na^+/(Li^+ + Na^+ + K^+)$ ($Na_2O/(Li_2O + Na_2O + K_2O)$) | 1.000 | 1.000 | 1.000 | 1.000 | 1.000 | 1.000 |
| | $R_2O + RO$ | 12.50 | 12.766 | 3.574 | 12.50 | 12.766 | 4.476 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 97.50 | 95.745 | 98.887 | 97.50 | 95.745 | 97.962 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 97.50 | 95.745 | 98.887 | 97.50 | 95.745 | 97.962 |
| Anion component | $O^{2-}$ | | 100 anion % | | | 100 anion % | |
| | Refractive index nd | | 2.0766 | | | 2.07501 | |
| | Abbé number vd | | 17.3 | | | 17.36 | |
| | Liquidus temperature [° C.] | | 1030 | | | 1020 | |
| | Glass transition temperature [° C.] | | 558 | | | 560 | |
| | Specific gravity | | 5.17 | | | 5.20 | |
| | Viscosity at liquidus temperature [dPa·s] | | 1.3 | | | 1.4 | |
| | $\lambda 5$ [nm] | | 425 | | | 423 | |
| | $\lambda 70$ [nm] | | 549 | | | 553 | |

TABLE 1-continued

| | | No. 17 | | | No. 18 | | |
|---|---|---|---|---|---|---|---|
| | | cation % | mole % | mass % | cation % | mole % | mass % |
| Cation component (expressed in oxide) | $P^{5+}$ ($P_2O_5$) | 27.50 | 23.400 | 15.210 | 27.50 | 23.900 | 15.550 |
| | $Bi^{3+}$ ($Bi_2O_3$) | 22.50 | 19.150 | 40.840 | 22.50 | 19.570 | 41.770 |
| | $Nb^{5+}$ ($Nb_2O_5$) | 22.50 | 19.150 | 23.300 | 22.50 | 19.570 | 23.830 |
| | $Ti^{4+}$ ($TiO_2$) | 10.00 | 17.020 | 6.220 | 10.00 | 17.390 | 6.370 |
| | $W^{6+}$ ($WO_3$) | 5.00 | 8.510 | 9.030 | 5.00 | 8.700 | 9.240 |
| | $Li^+$ ($Li_2O$) | 0.00 | 0.000 | 0.000 | 0.00 | 0.000 | 0.000 |
| | $Na^+$ ($Na_2O$) | 10.00 | 8.510 | 2.410 | 7.50 | 6.520 | 1.850 |
| | $K^+$ ($K_2O$) | 0.00 | 0.000 | 0.000 | 0.00 | 0.000 | 0.000 |
| | $B^{3+}$ ($B_2O_3$) | 0.00 | 0.000 | 0.000 | 5.00 | 4.350 | 1.390 |
| | $Ba^{2+}$ (BaO) | 2.50 | 4.260 | 2.990 | 0.00 | 0.000 | 0.000 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 60.00 | 63.830 | 79.390 | 60.00 | 65.230 | 81.210 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.167 | 0.267 | 0.078 | 0.167 | 0.267 | 0.078 |
| | $Li^+ + Na^+ + K^+$ ($Li_2O + Na_2O + K_2O$) | 10.00 | 8.510 | 2.410 | 7.50 | 6.520 | 1.850 |
| | $Na^+/(Li^+ + Na^+ + K^+)$ ($Na_2O/(Li_2O + Na_2O + K_2O)$) | 1.000 | 1.000 | 1.000 | 1.000 | 1.000 | 1.000 |
| | $R_2O + RO$ | 12.50 | 12.770 | 5.400 | 7.50 | 6.520 | 1.850 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 97.50 | 95.740 | 97.010 | 100.00 | 100.000 | 100.000 |
| Anion component | $O^{2-}$ | | 100 anion % | | | 100 anion % | |
| | Refractive index nd | | 2.07173 | | | 2.0764 | |
| | Abbé number vd | | 17.55 | | | 17.59 | |
| | Liquidus temperature [° C.] | | 1000 | | | 990 | |
| | Glass transition temperature [° C.] | | 561 | | | 548.6 | |
| | Specific gravity | | 5.26 | | | 5.12 | |
| | Viscosity at liquidus temperature [dPa · s] | | 1.6 | | | 2 | |
| | λ5 [nm] | | 422 | | | 437 | |
| | λ70 [nm] | | 537 | | | | |

| | | No. 19 | | | No. 20 | | |
|---|---|---|---|---|---|---|---|
| | | cation % | mole % | mass % | cation % | mole % | mass % |
| Cation component (expressed in oxide) | $P^{5+}$ ($P_2O_5$) | 27.50 | 22.920 | 14.850 | 27.50 | 23.670 | 16.150 |
| | $Bi^{3+}$ ($Bi_2O_3$) | 22.50 | 18.750 | 39.890 | 20.00 | 17.200 | 38.550 |
| | $Nb^{5+}$ ($Nb_2O_5$) | 22.50 | 18.750 | 22.760 | 22.50 | 19.350 | 24.740 |
| | $Ti^{4+}$ ($TiO_2$) | 10.00 | 16.670 | 6.080 | 11.25 | 19.350 | 7.440 |

TABLE 1-continued

| | | | | | | | |
|---|---|---|---|---|---|---|---|
| | $W^{6+}$ (WO$_3$) | 5.00 | 8.330 | 8.820 | 5.00 | 8.600 | 9.590 |
| | $Li^+$ (Li$_2$O) | 0.00 | 0.000 | 0.000 | 0.00 | 0.000 | 0.000 |
| | $Na^+$ (Na$_2$O) | 7.50 | 6.250 | 1.770 | 13.75 | 11.830 | 3.530 |
| | $K^+$ (K$_2$O) | 0.00 | 0.000 | 0.000 | 0.00 | 0.000 | 0.000 |
| | $B^{3+}$ (B$_2$O$_3$) | 0.00 | 0.000 | 0.000 | 0.00 | 0.000 | 0.000 |
| | $Ba^{2+}$ (BaO) | 5.00 | 8.330 | 5.830 | 0.00 | 0.000 | 0.000 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ (SiO$_2$) | 0.00 | 0.000 | 0.000 | 0.00 | 0.000 | 0.000 |
| | $Zr^{4+}$ (ZrO$_2$) | 0.00 | 0.000 | 0.000 | 0.00 | 0.000 | 0.000 |
| | Total | 100.00 | 100.000 | 100.000 | 100.00 | 100.000 | 100.000 |
| | Sb$_2$O$_3$ (Remarks 2) | — | — | 0.1 | — | — | 0.1 |
| | Bi$^{3+}$ + Nb$^{5+}$ + Ti$^{4+}$ + W$^{6+}$ (Bi$_2$O$_3$ + Nb$_2$O$_5$ + TiO$_2$ + WO$_3$) | 60.00 | 62.500 | 77.550 | 58.75 | 64.500 | 80.320 |
| | Ti$^{4+}$/(Bi$^{3+}$ + Nb$^{5+}$ + Ti$^{4+}$ + W$^{6+}$) (TiO$_2$/(Bi$_2$O$_3$ + Nb$_2$O$_5$ + TiO$_2$ + WO$_3$)) | 0.167 | 0.267 | 0.078 | 0.191 | 0.300 | 0.093 |
| | Li$^+$ + Na$^+$ + K$^+$ (Li$_2$O + Na$_2$O + K$_2$O) | 7.50 | 6.250 | 1.770 | 13.75 | 11.830 | 3.530 |
| | Na$^+$/(Li$^+$ + Na$^+$ + K$^+$) (Na$_2$O/(Li$_2$O + Na$_2$O + K$_2$O)) | 1.000 | 1.000 | 1.000 | 1.000 | 1.000 | 1.000 |
| | R$_2$O + RO | 12.50 | 14.580 | 7.600 | 13.75 | 11.830 | 3.530 |
| | P$^{5+}$ + Bi$^{3+}$ + Nb$^{5+}$ + Ti$^{4+}$ + W$^{6+}$ + Li$^+$ + Na$^+$ + K$^+$ + B$^{3+}$ + Si$^{4+}$ + Ba$^{2+}$ (P$_2$O$_5$ + Bi$_2$O$_3$ + Nb$_2$O$_5$ + TiO$_2$ + WO$_3$ + Li$_2$O + Na$_2$O + K$_2$O + B$_2$O$_3$ + SiO$_2$ + BaO) | 100.00 | 100.000 | 100.000 | 100.00 | 100.000 | 100.000 |
| | P$^{5+}$ + Bi$^{3+}$ + Nb$^{5+}$ + Ti$^{4+}$ + W$^{6+}$ + Li$^+$ + Na$^+$ + K$^+$ + Si$^{4+}$ + B$^{3+}$ (P$_2$O$_5$ + Bi$_2$O$_3$ + Nb$_2$O$_5$ + TiO$_2$ + WO$_3$ + Li$_2$O + Na$_2$O + K$_2$O + SiO$_2$ + B$_2$O$_3$) | 95.00 | 91.670 | 94.170 | 100.00 | 100.000 | 100.000 |
| Anion component | $O^{2-}$ | | 100 anion % | | | 100 anion % | |
| | Refractive index nd | | 2.0764 | | | 2.05737 | |
| | Abbé number vd | | 17.59 | | | 17.24 | |
| | Liquidus temperature [° C.] | | 990 | | | 1000 | |
| | Glass transition temperature [° C.] | | 569.1 | | | 557.4 | |
| | Specific gravity | | 5.3 | | | 4.98 | |
| | Viscosity at liquidus temperature [dPa · s] | | 1.6 | | | 2.6 | |
| | λ5 [nm] | | 423 | | | 414 | |
| | λ70 [nm] | | 558 | | | 492 | |

| | | No. | | | | | |
|---|---|---|---|---|---|---|---|
| | | 21 | | | 22 | | |
| | | cation % | mole % | mass % | cation % | mole % | mass % |
| Cation component (expressed in oxide) | $P^{5+}$ (P$_2$O$_5$) | 27.50 | 23.670 | 16.110 | 27.50 | 23.670 | 16.100 |
| | $Bi^{3+}$ (Bi$_2$O$_3$) | 20.00 | 17.200 | 38.460 | 20.00 | 17.200 | 38.430 |
| | $Nb^{5+}$ (Nb$_2$O$_5$) | 22.50 | 19.350 | 24.680 | 22.50 | 19.350 | 24.670 |
| | $Ti^{4+}$ (TiO$_2$) | 11.25 | 19.350 | 7.420 | 11.25 | 19.350 | 7.410 |
| | $W^{6+}$ (WO$_3$) | 5.00 | 8.600 | 9.570 | 5.00 | 8.600 | 9.560 |
| | $Li^+$ (Li$_2$O) | 0.00 | 0.000 | 0.000 | 0.00 | 0.000 | 0.000 |
| | $Na^+$ (Na$_2$O) | 6.25 | 5.380 | 1.600 | 3.75 | 3.230 | 0.960 |
| | $K^+$ (K$_2$O) | 0.00 | 0.000 | 0.000 | 0.00 | 0.000 | 0.000 |
| | $B^{3+}$ (B$_2$O$_3$) | 7.50 | 6.450 | 2.160 | 10.00 | 8.600 | 2.870 |
| | $Ba^{2+}$ (BaO) | 0.00 | 0.000 | 0.000 | 0.00 | 0.000 | 0.000 |
| | $Sr^{2+}$ (SrO) | 0.00 | 0.000 | 0.000 | 0.00 | 0.000 | 0.000 |

TABLE 1-continued

| | | | | | | | |
|---|---|---|---|---|---|---|---|
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ (SiO$_2$) | 0.00 | 0.000 | 0.000 | 0.00 | 0.000 | 0.000 |
| | $Zr^{4+}$ (ZrO$_2$) | 0.00 | 0.000 | 0.000 | 0.00 | 0.000 | 0.000 |
| | Total | 100.00 | 100.000 | 100.000 | 100.00 | 100.000 | 100.000 |
| | Sb$_2$O$_3$ (Remarks 2) | — | — | 0.1 | — | — | 0.1 |
| | $Bi^{3+} + Nb^{5+} + Ti^{4+} + W^{5+}$ (Bi$_2$O$_3$ + Nb$_2$O$_5$ + TiO$_2$ + WO$_3$) | 58.75 | 64.500 | 80.130 | 58.75 | 64.500 | 80.070 |
| | $Ti^{4+}/(Bi^{3+} + Nb^{5+} + Ti^{4+} + W^{6+})$ (TiO$_2$/(Bi$_2$O$_3$ + Nb$_2$O$_5$ + TiO$_2$ + WO$_3$)) | 0.191 | 0.300 | 0.093 | 0.191 | 0.300 | 0.093 |
| | $Li^+ + Na^+ + K^+$ (Li$_2$O + Na$_2$O + K$_2$O) | 6.25 | 5.380 | 1.600 | 3.75 | 3.230 | 0.960 |
| | $Na^+/(Li^+ + Na^+ + K^+)$ (Na$_2$O/(Li$_2$O + Na$_2$O + K$_2$O)) | 1.000 | 1.000 | 1.000 | 1.000 | 1.000 | 1.000 |
| | $R_2O + RO$ | 6.25 | 5.380 | 1.600 | 3.75 | 3.230 | 0.960 |
| | $P^{5+} + Bi^{3+} + Nb^{5+} + Ti^{4+} + W^{6+} + Li^+ + Na^+ + K^+ + B^{3+} + Si^{4+} + Ba^{2+}$ (P$_2$O$_5$ + Bi$_2$O$_3$ + Nb$_2$O$_5$ + TiO$_2$ + WO$_3$ + Li$_2$O + Na$_2$O + K$_2$O + B$_2$O$_3$ + SiO$_2$ + BaO) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ (P$_2$O$_5$ + Bi$_2$O$_3$ + Nb$_2$O$_5$ + TiO$_2$ + WO$_3$ + Li$_2$O + Na$_2$O + K$_2$O + SiO$_2$ + B$_2$O$_3$) | 100.00 | 100.000 | 100.000 | 100.00 | 100.000 | 100.000 |
| Anion component | $O^{2-}$ | | 100 anion % | | | 100 anion % | |
| | Refractive index nd | | 2.0613 | | | 2.0591 | |
| | Abbé number vd | | 17.4 | | | 17.57 | |
| | Liquidus temperature [° C.] | | 990 | | | 1030 | |
| | Glass transition temperature [° C.] | | 550.1 | | | 550.4 | |
| | Specific gravity | | 4.95 | | | 4.93 | |
| | Viscosity at liquidus temperature [dPa · s] | | 3.4 | | | 2 | |
| | λ5 [nm] | | 426 | | | 414 | |
| | λ70 [nm] | | 668 | | | 544 | |

| | | No. | | | | | |
|---|---|---|---|---|---|---|---|
| | | 23 | | | 24 | | |
| | | cation % | mole % | mass % | cation % | mole % | mass % |
| Cation component (expressed in oxide) | $P^{5+}$ (P$_2$O$_5$) | 27.49 | 23.520 | 16.350 | 27.49 | 23.140 | 15.990 |
| | $Bi^{3+}$ (Bi$_2$O$_3$) | 20.00 | 17.110 | 39.030 | 20.00 | 16.820 | 38.170 |
| | $Nb^{5+}$ (Nb$_2$O$_5$) | 21.88 | 18.720 | 24.350 | 21.88 | 18.400 | 23.820 |
| | $Ti^{4+}$ (TiO$_2$) | 12.50 | 21.390 | 8.360 | 12.50 | 21.030 | 8.180 |
| | $W^{6+}$ (WO$_3$) | 4.38 | 7.490 | 8.500 | 4.38 | 7.360 | 8.310 |
| | $Li^+$ (Li$_2$O) | 3.00 | 2.570 | 0.380 | 1.00 | 0.840 | 0.120 |
| | $Na^+$ (Na$_2$O) | 3.25 | 2.780 | 0.840 | 5.25 | 4.420 | 1.330 |
| | $K^+$ (K$_2$O) | 0.00 | 0.000 | 0.000 | 0.00 | 0.000 | 0.000 |
| | $B^{3+}$ (B$_2$O$_3$) | 7.50 | 6.420 | 2.190 | 5.50 | 4.630 | 1.570 |
| | $Ba^{2+}$ (BaO) | 0.00 | 0.000 | 0.000 | 2.00 | 3.360 | 2.510 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ (SiO$_2$) | 0.00 | 0.000 | 0.000 | 0.00 | 0.000 | 0.000 |
| | $Zr^{4+}$ (ZrO$_2$) | 0.00 | 0.000 | 0.000 | 0.00 | 0.000 | 0.000 |
| | Total | 100.00 | 100.000 | 100.000 | 100.00 | 100.000 | 100.000 |
| | Sb$_2$O$_3$ (Remarks 2) | — | — | 0.1 | — | — | 0.1 |
| | $Bi^{3+} + Nb^{5+} + Ti^{4+} + W^{6+}$ (Bi$_2$O$_3$ + Nb$_2$O$_5$ + TiO$_2$ + WO$_3$) | 58.76 | 64.710 | 80.240 | 58.76 | 63.610 | 78.480 |

TABLE 1-continued

| | | | | | | | |
|---|---|---|---|---|---|---|---|
| | Ti$^{4+}$/(Bi$^{3+}$ + Nb$^{5+}$ + Ti$^{4+}$ + W$^{6+}$) (TiO$_2$/(Bi$_2$O$_3$ + Nb$_2$O$_5$ + TiO$_2$ + WO$_3$)) | 0.213 | 0.331 | 0.104 | 0.213 | 0.331 | 0.104 |
| | Li$^+$ + Na$^+$ + K$^+$ (Li$_2$O + Na$_2$O + K$_2$O) | 6.25 | 5.350 | 1.220 | 6.25 | 5.260 | 1.450 |
| | Na$^+$/(Li$^+$ + Na$^+$ + K$^+$) (Na$_2$O/(Li$_2$O + Na$_2$O + K$_2$O)) | 0.520 | 0.520 | 0.689 | 0.840 | 0.840 | 0.917 |
| | R$_2$O + RO | 6.25 | 5.350 | 1.220 | 8.25 | 8.620 | 3.960 |
| | P$^{5+}$ + Bi$^{3+}$ + Nb$^{5+}$ + Ti$^{4+}$ + W$^{6+}$ + Li$^+$ + Na$^+$ + K$^+$ + B$^{3+}$ + Si$^{4+}$ + Ba$^{2+}$ (P$_2$O$_5$ + Bi$_2$O$_3$ + Nb$_2$O$_5$ + TiO$_2$ + WO$_3$ + Li$_2$O + Na$_2$O + K$_2$O + B$_2$O$_3$ + SiO$_2$ + BaO) | 100.00 | 100.000 | 100.000 | 100.00 | 100.000 | 100.000 |
| | P$^{5+}$ + Bi$^{3+}$ + Nb$^{5+}$ + Ti$^{4+}$ + W$^{6+}$ + Li$^+$ + Na$^+$ + K$^+$ + Si$^{4+}$ + B$^{3+}$ (P$_2$O$_5$ + Bi$_2$O$_3$ + Nb$_2$O$_5$ + TiO$_2$ + WO$_3$ + Li$_2$O + Na$_2$O + K$_2$O + SiO$_2$ + B$_2$O$_3$) | 100.00 | 100.000 | 100.000 | 98.00 | 96.640 | 97.490 |
| Anion component | O$^{2-}$ | | 100 anion % | | | 100 anion % | |
| | Refractive index nd | | 2.07019 | | | 2.06785 | |
| | Abbé number vd | | 17.34 | | | 17.43 | |
| | Liquidus temperature [° C.] | | 1010 | | | 1020 | |
| | Glass transition temperature [° C.] | | 540.2 | | | 550.8 | |
| | Specific gravity | | 4.99 | | | 5.01 | |
| | Viscosity at liquidus temperature [dPa·s] | | 2 | | | 1.8 | |
| | λ5 [nm] | | 416 | | | 418 | |
| | λ70 [nm] | | 531 | | | 531 | |

| | | No. | | | | | |
|---|---|---|---|---|---|---|---|
| | | 25 | | | 26 | | |
| | | cation % | mole % | mass % | cation % | mole % | mass % |
| Cation component (expressed in oxide) | P$^{5+}$ (P$_2$O$_5$) | 28.50 | 24.520 | 15.630 | 28.64 | 24.510 | 15.270 |
| | Bi$^{3+}$ (Bi$_2$O$_3$) | 24.00 | 20.650 | 43.220 | 25.00 | 21.380 | 43.740 |
| | Nb$^{5+}$ (Nb$_2$O$_5$) | 22.50 | 19.350 | 23.110 | 23.44 | 20.040 | 23.400 |
| | Ti$^{4+}$ (TiO$_2$) | 11.25 | 19.350 | 6.950 | 11.72 | 20.040 | 7.030 |
| | W$^{6+}$ (WO$_3$) | 5.00 | 8.600 | 8.960 | 5.21 | 8.910 | 9.070 |
| | Li$^+$ (Li$_2$O) | 0.00 | 0.000 | 0.000 | 0.00 | 0.000 | 0.000 |
| | Na$^+$ (Na$_2$O) | 7.75 | 6.670 | 1.860 | 2.86 | 2.450 | 0.670 |
| | K$^+$ (K$_2$O) | 0.00 | 0.000 | 0.000 | 0.00 | 0.000 | 0.000 |
| | B$^{3+}$ (B$_2$O$_3$) | 1.00 | 0.860 | 0.270 | 3.13 | 2.670 | 0.820 |
| | Ba$^{2+}$ (BaO) | 0.00 | 0.000 | 0.000 | 0.00 | 0.000 | 0.000 |
| | Sr$^{2+}$ (SrO) | 0.00 | 0.000 | 0.000 | 0.00 | 0.000 | 0.000 |
| | Ca$^{2+}$ (CaO) | 0.00 | 0.000 | 0.000 | 0.00 | 0.000 | 0.000 |
| | Mg$^{2+}$ (MgO) | 0.00 | 0.000 | 0.000 | 0.00 | 0.000 | 0.000 |
| | Si$^{4+}$ (SiO$_2$) | 0.00 | 0.000 | 0.000 | 0.00 | 0.000 | 0.000 |
| | Zr$^{4+}$ (ZrO$_2$) | 0.00 | 0.000 | 0.000 | 0.00 | 0.000 | 0.000 |
| | Total | 100.00 | 100.000 | 100.000 | 100.00 | 100.000 | 100.000 |
| | Sb$_2$O$_3$ (Remarks 2) | — | — | 0.1 | — | — | 0.1 |
| | Bi$^{3+}$ + Nb$^{5+}$ + Ti$^{4+}$ + W$^{6+}$ (Bi$_2$O$_3$ + Nb$_2$O$_5$ + TiO$_2$ + WO$_3$) | 62.75 | 67.950 | 82.240 | 65.37 | 70.370 | 83.240 |
| | Ti$^{4+}$/(Bi$^{3+}$ + Nb$^{5+}$ + Ti$^{4+}$ + W$^{6+}$) (TiO$_2$/(Bi$_2$O$_3$ + Nb$_2$O$_5$ + TiO$_2$ + WO$_3$)) | 0.179 | 0.285 | 0.085 | 0.179 | 0.285 | 0.084 |
| | Li$^+$ + Na$^+$ + K$^+$ (Li$_2$O + Na$_2$O + K$_2$O) | 7.75 | 6.670 | 1.860 | 2.86 | 2.450 | 0.670 |
| | Na$^+$/(Li$^+$ + Na$^+$ + K$^+$) (Na$_2$O/(Li$_2$O + Na$_2$O + K$_2$O)) | 1.000 | 1.000 | 1.000 | 1.000 | 1.000 | 1.000 |
| | R$_2$O + RO | 7.75 | 6.670 | 1.860 | 2.86 | 2.450 | 0.670 |
| | P$^{5+}$ + Bi$^{3+}$ + Nb$^{5+}$ + Ti$^{4+}$ + W$^{6+}$ + Li$^+$ + Na$^+$ + K$^+$ + B$^{3+}$ + Si$^{4+}$ + Ba$^{2+}$ (P$_2$O$_5$ + Bi$_2$O$_3$ + Nb$_2$O$_5$ + TiO$_2$ + WO$_3$ + Li$_2$O + Na$_2$O + K$_2$O + B$_2$O$_3$ + SiO$_2$ + BaO) | 100.00 | 100.000 | 100.000 | 100.00 | 100.000 | 100.000 |
| | P$^{5+}$ + Bi$^{3+}$ + Nb$^{5+}$ + Ti$^{4+}$ + W$^{6+}$ + Li$^+$ + Na$^+$ + K$^+$ + Si$^{4+}$ + B$^{3+}$ (P$_2$O$_5$ + Bi$_2$O$_3$ + Nb$_2$O$_5$ + TiO$_2$ + WO$_3$ + Li$_2$O + Na$_2$O + K$_2$O + SiO$_2$ + B$_2$O$_3$) | 100.00 | 100.000 | 100.000 | 100.00 | 100.000 | 100.000 |

TABLE 1-continued

| Anion component | $O^{2-}$ | 100 anion % | 100 anion % |
|---|---|---|---|
| | Refractive index nd | 2.09018 | 2.10496 |
| | Abbé number vd | 17.03 | 16.89 |
| | Liquidus temperature [° C.] | 990 | 1000 |
| | Glass transition temperature [° C.] | 557.6 | 559.8 |
| | Specific gravity | 5.22 | 5.26 |
| | Viscosity at liquidus temperature [dPa · s] | 2.6 | 2.2 |
| | λ5 [nm] | 423 | 416 |
| | λ70 [nm] | 550 | 500 |

| | | No. 27 | | | No. 28 | | |
|---|---|---|---|---|---|---|---|
| | | cation % | mole % | mass % | cation % | mole % | mass % |
| Cation component (expressed in oxide) | $P^{5+}$ ($P_2O_5$) | 27.13 | 23.131 | 14.322 | 27.60 | 23.397 | 14.716 |
| | $Bi^{3+}$ ($Bi_2O_3$) | 25.52 | 21.757 | 44.224 | 25.00 | 21.192 | 43.758 |
| | $Nb^{5+}$ ($Nb_2O_5$) | 23.94 | 20.411 | 23.667 | 23.44 | 19.869 | 23.404 |
| | $Ti^{4+}$ ($TiO_2$) | 11.97 | 20.411 | 7.112 | 11.72 | 19.869 | 7.034 |
| | $W^{6+}$ ($WO_3$) | 5.32 | 9.072 | 9.174 | 5.21 | 8.833 | 9.074 |
| | $Li^+$ ($Li_2O$) | 0.00 | 0.000 | 0.000 | 0.00 | 0.000 | 0.000 |
| | $Na^+$ ($Na_2O$) | 2.93 | 2.498 | 0.675 | 0.78 | 0.661 | 0.182 |
| | $K^+$ ($K_2O$) | 0.00 | 0.000 | 0.000 | 0.00 | 0.000 | 0.000 |
| | $B^{3+}$ ($B_2O_3$) | 3.19 | 2.720 | 0.826 | 5.21 | 4.416 | 1.363 |
| | $Ba^{2+}$ (BaO) | 0.00 | 0.000 | 0.000 | 0.00 | 0.000 | 0.000 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 0.00 | 0.000 | 0.000 | 1.04 | 1.763 | 0.469 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 66.75 | 71.651 | 84.177 | 65.37 | 69.763 | 83.270 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.179 | 0.285 | 0.084 | 0.179 | 0.285 | 0.084 |
| | $Li^+ + Na^+ + K^+$ ($Li_2O + Na_2O + K_2O$) | 2.93 | 2.498 | 0.68 | 0.78 | 0.661 | 0.18 |
| | $Na^+/(Li^+ + Na^+ + K^+)$ ($Na_2O/(Li_2O + Na_2O + K_2O)$) | 1.000 | 1.000 | 1.000 | 1.000 | 1.000 | 1.000 |
| | $R_2O + RO$ | 2.93 | 2.498 | 0.675 | 0.78 | 0.661 | 0.182 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.000 | 100.000 | 100.00 | 100.000 | 100.000 |
| Anion component | $O^{2-}$ | | 100 anion % | | | 100 anion % | |
| | Refractive index nd | | 2.12125 | | | 2.10027 | |
| | Abbé number vd | | 16.63 | | | 17.01 | |
| | Liquidus temperature [° C.] | | 1030 | | | 1000 | |
| | Glass transition temperature [° C.] | | 558 | | | 561 | |
| | Specific gravity | | 5.33 | | | 5.24 | |
| | Viscosity at liquidus temperature [dPa · s] | | 1.6 | | | 2.6 | |
| | λ5 [nm] | | 423 | | | 422 | |
| | λ70 [nm] | | 558 | | | 568 | |

TABLE 1-continued

| | | No. 29 | | | No. 30 | | |
|---|---|---|---|---|---|---|---|
| | | cation % | mole % | mass % | cation % | mole % | mass % |
| Cation component (expressed in oxide) | P$^{5+}$ (P$_2$O$_5$) | 27.46 | 23.192 | 14.690 | 28.65 | 24.073 | 14.862 |
| | Bi$^{3+}$ (Bi$_2$O$_3$) | 24.86 | 20.997 | 43.656 | 27.08 | 22.754 | 46.115 |
| | Nb$^{5+}$ (Nb$_2$O$_5$) | 23.32 | 19.696 | 23.362 | 21.35 | 17.940 | 20.740 |
| | Ti$^{4+}$ (TiO$_2$) | 11.66 | 19.696 | 7.021 | 11.72 | 19.696 | 6.843 |
| | W$^{6+}$ (WO$_3$) | 5.18 | 8.750 | 9.052 | 5.21 | 8.756 | 8.829 |
| | Li$^+$ (Li$_2$O) | 0.00 | 0.000 | 0.000 | 0.00 | 0.000 | 0.000 |
| | Na$^+$ (Na$_2$O) | 1.81 | 1.529 | 0.423 | 0.26 | 0.218 | 0.059 |
| | K$^+$ (K$_2$O) | 0.00 | 0.000 | 0.000 | 0.00 | 0.000 | 0.000 |
| | B$^{3+}$ (B$_2$O$_3$) | 4.15 | 3.505 | 1.089 | 3.65 | 3.067 | 0.929 |
| | Ba$^{2+}$ (BaO) | 0.00 | 0.000 | 0.000 | 1.04 | 1.748 | 1.166 |
| | Sr$^{2+}$ (SrO) | 0.00 | 0.000 | 0.000 | 0.00 | 0.000 | 0.000 |
| | Ca$^{2+}$ (CaO) | 0.00 | 0.000 | 0.000 | 0.00 | 0.000 | 0.000 |
| | Mg$^{2+}$ (MgO) | 0.00 | 0.000 | 0.000 | 0.00 | 0.000 | 0.000 |
| | Si$^{4+}$ (SiO$_2$) | 1.04 | 1.757 | 0.471 | 1.04 | 1.748 | 0.457 |
| | Zr$^{4+}$ (ZrO$_2$) | 0.52 | 0.878 | 0.236 | 0.00 | 0.000 | 0.000 |
| | Total | 100.00 | 100.000 | 100.000 | 100.00 | 100.000 | 100.000 |
| | Sb$_2$O$_3$ (Remarks 2) | — | — | 0.08 | — | — | 0.08 |
| | Bi$^{3+}$ + Nb$^{5+}$ + Ti$^{4+}$ + W$^{6+}$ (Bi$_2$O$_3$ + Nb$_2$O$_5$ + TiO$_2$ + WO$_3$) | 65.02 | 69.139 | 83.091 | 65.36 | 69.146 | 82.527 |
| | Ti$^{4+}$/(Bi$^{3+}$ + Nb$^{5+}$ + Ti$^{4+}$ + W$^{6+}$) (TiO$_2$/(Bi$_2$O$_3$ + Nb$_2$O$_5$ + TiO$_2$ + WO$_3$)) | 0.179 | 0.285 | 0.084 | 0.179 | 0.285 | 0.083 |
| | Li$^+$ + Na$^+$ + K$^+$ (Li$_2$O + Na$_2$O + K$_2$O) | 1.81 | 1.529 | 0.423 | 0.26 | 0.218 | 0.059 |
| | Na$^+$/(Li$^+$ + Na$^+$ + K$^+$) (Na$_2$O/(Li$_2$O + Na$_2$O + K$_2$O)) | 1.000 | 1.000 | 1.000 | 1.000 | 1.000 | 1.000 |
| | R$_2$O + RO | 1.81 | 1.529 | 0.423 | 1.30 | 1.966 | 1.225 |
| | P$^{5+}$ + Bi$^{3+}$ + Nb$^{5+}$ + Ti$^{4+}$ + W$^{6+}$ + Li$^+$ + Na$^+$ + K$^+$ + B$^{3+}$ + Si$^{4+}$ + Ba$^{2+}$ (P$_2$O$_5$ + Bi$_2$O$_3$ + Nb$_2$O$_5$ + TiO$_2$ + WO$_3$ + Li$_2$O + Na$_2$O + K$_2$O + B$_2$O$_3$ + SiO$_2$ + BaO) | 99.48 | 99.122 | 99.764 | 100.00 | 100.000 | 100.000 |
| | P$^{5+}$ + Bi$^{3+}$ + Nb$^{5+}$ + Ti$^{4+}$ + W$^{6+}$ + Li$^+$ + Na$^+$ + K$^+$ + Si$^{4+}$ + B$^{3+}$ (P$_2$O$_5$ + Bi$_2$O$_3$ + Nb$_2$O$_5$ + TiO$_2$ + WO$_3$ + Li$_2$O + Na$_2$O + K$_2$O + SiO$_2$ + B$_2$O$_3$) | 99.48 | 99.122 | 99.764 | 98.96 | 98.252 | 98.834 |
| Anion component | O$^{2-}$ | | 100 anion % | | | 100 anion % | |
| | Refractive index nd | | 2.10429 | | | 2.10124 | |
| | Abbé number vd | | 16.97 | | | 17.17 | |
| | Liquidus temperature [° C.] | | 1040 | | | 970 | |
| | Glass transition temperature [° C.] | | 565 | | | 551.4 | |
| | Specific gravity | | 5.25 | | | 5.36 | |
| | Viscosity at liquidus temperature [dPa · s] | | 1.6 | | | 3.5 | |
| | λ5 [nm] | | 424 | | | 418 | |
| | λ70 [nm] | | 563 | | | | |

| | | No. 31 | | | No. 32 | | |
|---|---|---|---|---|---|---|---|
| | | cation % | mole % | mass % | cation % | mole % | mass % |
| Cation component (expressed in oxide) | P$^{5+}$ (P$_2$O$_5$) | 27.72 | 22.579 | 13.989 | 27.72 | 22.220 | 14.094 |
| | Bi$^{3+}$ (Bi$_2$O$_3$) | 25.74 | 20.966 | 42.643 | 25.74 | 20.633 | 42.965 |
| | Nb$^{5+}$ (Nb$_2$O$_5$) | 20.30 | 16.535 | 19.184 | 18.32 | 14.685 | 17.443 |
| | Ti$^{4+}$ (TiO$_2$) | 11.14 | 18.148 | 6.328 | 13.12 | 21.034 | 7.508 |

TABLE 1-continued

|  |  | | | | | | |
|---|---|---|---|---|---|---|---|
| | $W^{6+}$ ($WO_3$) | 8.91 | 14.515 | 14.688 | 8.91 | 14.285 | 14.799 |
| | $Li^+$ ($Li_2O$) | 0.00 | 0.000 | 0.000 | 0.00 | 0.000 | 0.000 |
| | $Na^+$ ($Na_2O$) | 0.00 | 0.000 | 0.000 | 0.00 | 0.000 | 0.000 |
| | $K^+$ ($K_2O$) | 0.00 | 0.000 | 0.000 | 0.00 | 0.000 | 0.000 |
| | $B^{3+}$ ($B_2O_3$) | 3.47 | 2.826 | 0.859 | 3.47 | 2.782 | 0.865 |
| | $Ba^{2+}$ (BaO) | 1.73 | 2.818 | 1.886 | 1.73 | 2.774 | 1.900 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 0.99 | 1.613 | 0.423 | 0.99 | 1.587 | 0.426 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.08 | — | — | 0.08 |
| | $Bi^{3+} + Nb^{5+} + Ti^{4+} + W^{6+}$ ($Bi_2O_3 + Nb_2O_5 + TiO_2 + WO_3$) | 66.09 | 70.164 | 82.843 | 66.09 | 70.637 | 82.715 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.169 | 0.259 | 0.076 | 0.199 | 0.298 | 0.091 |
| | $Li^+ + Na^+ + K^+$ ($Li_2O + Na_2O + K_2O$) | 0.00 | 0.000 | 0.000 | 0.00 | 0.000 | 0.000 |
| | $Na^+/(Li^+ + Na^+ + K^+)$ ($Na_2O/(Li_2O + Na_2O + K_2O)$) | — | — | — | — | — | — |
| | $R_2O + RO$ | 1.73 | 2.818 | 1.886 | 1.73 | 2.774 | 1.900 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 98.27 | 97.182 | 98.114 | 98.27 | 97.226 | 98.100 |
| Anion component | $O^{2-}$ | | 100 anion % | | | 100 anion % | |
| | Refractive index nd | | 2.10639 | | | 2.10791 | |
| | Abbé number vd | | 17.01 | | | 16.9 | |
| | Liquidus temperature [° C.] | | 970 | | | 990 | |
| | Glass transition temperature [° C.] | | 562.5 | | | 562.8 | |
| | Specific gravity | | 5.46 | | | 5.46 | |
| | Viscosity at liquidus temperature [dPa·s] | | 3.4 | | | 2.6 | |
| | λ5 [nm] | | 424 | | | 428 | |
| | λ70 [nm] | | 579 | | | | |

| | | No. | | | | | |
|---|---|---|---|---|---|---|---|
| | | 33 | | | 34 | | |
| | | cation % | mole % | mass % | cation % | mole % | mass % |
| Cation component (expressed in oxide) | $P^{5+}$ ($P_2O_5$) | 26.50 | 22.601 | 13.724 | 30.50 | 26.012 | 16.580 |
| | $Bi^{3+}$ ($Bi_2O_3$) | 28.00 | 23.880 | 47.602 | 24.00 | 20.469 | 42.827 |
| | $Nb^{5+}$ ($Nb_2O_5$) | 22.50 | 19.190 | 21.821 | 22.50 | 19.190 | 22.904 |
| | $Ti^{4+}$ ($TiO_2$) | 11.25 | 19.190 | 6.558 | 11.25 | 19.190 | 6.883 |
| | $W^{6+}$ ($WO_3$) | 5.00 | 8.529 | 8.459 | 5.00 | 8.529 | 8.879 |
| | $Li^+$ ($Li_2O$) | 0.00 | 0.000 | 0.000 | 0.00 | 0.000 | 0.000 |
| | $Na^+$ ($Na_2O$) | 2.25 | 1.919 | 0.509 | 2.25 | 1.919 | 0.534 |
| | $K^+$ ($K_2O$) | 0.00 | 0.000 | 0.000 | 0.00 | 0.000 | 0.000 |
| | $B^{3+}$ ($B_2O_3$) | 3.50 | 2.985 | 0.889 | 3.50 | 2.985 | 0.933 |
| | $Ba^{2+}$ (BaO) | 0.00 | 0.000 | 0.000 | 0.00 | 0.000 | 0.000 |
| | $Sr^{2+}$ (SrO) | 0.00 | 0.000 | 0.000 | 0.00 | 0.000 | 0.000 |

TABLE 1-continued

| | | | | | | | | |
|---|---|---|---|---|---|---|---|---|
| | | $Ca^{2+}$ (CaO) | 0.00 | 0.000 | 0.000 | 0.00 | 0.000 | 0.000 |
| | | $Mg^{2+}$ (MgO) | 0.00 | 0.000 | 0.000 | 0.00 | 0.000 | 0.000 |
| | | $Si^{4+}$ ($SiO_2$) | 1.00 | 1.706 | 0.438 | 1.00 | 1.706 | 0.460 |
| | | $Zr^{4+}$ ($ZrO_2$) | 0.00 | 0.000 | 0.000 | 0.00 | 0.000 | 0.000 |
| | | Total | 100.00 | 100.000 | 100.000 | 100.00 | 100.000 | 100.000 |
| | | $Sb_2O_3$ (Remarks 2) | — | — | 0.08 | — | — | 0.08 |
| | | $Bi^{3+} + Nb^{5+} + Ti^{4+} + W^{6+}$ ($Bi_2O_3 + Nb_2O_5 + TiO_2 + WO_3$) | 66.75 | 70.789 | 84.440 | 62.75 | 67.378 | 81.493 |
| | | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.169 | 0.271 | 0.078 | 0.179 | 0.285 | 0.084 |
| | | $Li^+ + Na^+ + K^+$ ($Li_2O + Na_2O + K_2O$) | 2.25 | 1.919 | 0.51 | 2.25 | 1.919 | 0.53 |
| | | $Na^+/(Li^+ + Na^+ + K^+)$ ($Na_2O/(Li_2O + Na_2O + K_2O)$) | 1.000 | 1.000 | 1.000 | 1.000 | 1.000 | 1.000 |
| | | $R_2O + RO$ | 2.25 | 1.919 | 0.509 | 2.25 | 1.919 | 0.534 |
| | | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.000 | 100.000 | 100.00 | 100.000 | 100.000 |
| Anion component | | $O^{2-}$ | | 100 anion % | | | 100 anion % | |
| | | Refractive index nd | | 2.12197 | | | 2.0768 | |
| | | Abbé number vd | | 16.74 | | | 17.36 | |
| | | Liquidus temperature [° C.] | | 980 | | | 1000 | |
| | | Glass transition temperature [° C.] | | 551 | | | 559 | |
| | | Specific gravity | | 5.44 | | | 5.121 | |
| | | Viscosity at liquidus temperature [dPa · s] | | 3 | | | 2.3 | |
| | | λ5 [nm] | | 435 | | | 430 | |
| | | λ70 [nm] | | | | | | |

| | | | No. | | | | | |
|---|---|---|---|---|---|---|---|---|
| | | | 35 | | | 36 | | |
| | | | cation % | mole % | mass % | cation % | mole % | mass % |
| Cation component (expressed in oxide) | | $P^{5+}$ ($P_2O_5$) | 24.46 | 20.598 | 12.790 | 25.96 | 20.609 | 12.723 |
| | | $Bi^{3+}$ ($Bi_2O_3$) | 26.08 | 21.962 | 44.768 | 25.00 | 19.848 | 40.220 |
| | | $Nb^{5+}$ ($Nb_2O_5$) | 24.46 | 20.598 | 23.952 | 19.71 | 15.648 | 18.089 |
| | | $Ti^{4+}$ ($TiO_2$) | 12.23 | 20.598 | 7.198 | 10.82 | 17.180 | 5.969 |
| | | $W^{6+}$ ($WO_3$) | 5.43 | 9.145 | 9.275 | 12.50 | 19.848 | 20.012 |
| | | $Li^+$ ($Li_2O$) | 0.00 | 0.000 | 0.000 | 0.00 | 0.000 | 0.000 |
| | | $Na^+$ ($Na_2O$) | 2.45 | 2.063 | 0.559 | 0.00 | 0.000 | 0.000 |
| | | $K^+$ ($K_2O$) | 0.00 | 0.000 | 0.000 | 0.00 | 0.000 | 0.000 |
| | | $B^{3+}$ ($B_2O_3$) | 3.80 | 3.200 | 0.975 | 3.37 | 2.675 | 0.810 |
| | | $Ba^{2+}$ (BaO) | 0.00 | 0.000 | 0.000 | 1.68 | 2.668 | 1.779 |
| | | $Sr^{2+}$ (SrO) | 0.00 | 0.000 | 0.000 | 0.00 | 0.000 | 0.000 |
| | | $Ca^{2+}$ (CaO) | 0.00 | 0.000 | 0.000 | 0.00 | 0.000 | 0.000 |
| | | $Mg^{2+}$ (MgO) | 0.00 | 0.000 | 0.000 | 0.00 | 0.000 | 0.000 |
| | | $Si^{4+}$ ($SiO_2$) | 1.09 | 1.836 | 0.483 | 0.96 | 1.524 | 0.398 |
| | | $Zr^{4+}$ ($ZrO_2$) | 0.00 | 0.000 | 0.000 | 0.00 | 0.000 | 0.000 |
| | | Total | 100.00 | 100.000 | 100.000 | 100.00 | 100.000 | 100.000 |
| | | $Sb_2O_3$ (Remarks 2) | — | — | 0.08 | — | — | 0.08 |
| | | $Bi^{3+} + Nb^{5+} + Ti^{4+} + W^{6+}$ ($Bi_2O_3 + Nb_2O_5 + TiO_2 + WO_3$) | 68.20 | 72.303 | 85.193 | 68.03 | 72.524 | 84.290 |

TABLE 1-continued

|  |  |  |  |  |  |  |  |
|---|---|---|---|---|---|---|---|
|  | $Ti^{4+}/(Bi^{3+} + Nb^{5+} + Ti^{4+} + W^{6+})$ $(TiO_2/(Bi_2O_3 + Nb_2O_5 + TiO_2 + WO_3))$ | 0.179 | 0.285 | 0.084 | 0.159 | 0.237 | 0.071 |
|  | $Li^+ + Na^+ + K^+$ $(Li_2O + Na_2O + K_2O)$ | 2.45 | 2.063 | 0.559 | 0.00 | 0.000 | 0.000 |
|  | $Na^+/(Li^+ + Na^+ + K^+)$ $(Na_2O/(Li_2O + Na_2O + K_2O))$ | 1.000 | 1.000 | 1.000 | — | — | — |
|  | $R_2O + RO$ | 2.45 | 2.063 | 0.559 | 1.68 | 2.668 | 1.779 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ $(P_2O_5 + Bi_2O_3 + Nb_2O_5 + TiO_2 + WO_3 + Li_2O + Na_2O + K_2O + B_2O_3 + SiO_2 + BaO)$ | 100.00 | 100.000 | 100.000 | 100.00 | 100.000 | 100.000 |
|  | $P^{5+} + Bi^{3+} + Nb^{5+} + Ti^{4+} + W^{6+} + Li^+ + Na^+ + K^+ + Si^{4+} + B^{3+}$ $(P_2O_5 + Bi_2O_3 + Nb_2O_5 + TiO_2 + WO_3 + Li_2O + Na_2O + K_2O + SiO_2 + B_2O_3)$ | 100.00 | 100.000 | 100.000 | 98.32 | 97.332 | 98.221 |
| Anion component | $O^{2-}$ |  | 100 anion % |  |  | 100 anion % |  |
|  | Refractive index nd |  | 2.13917 |  |  | 2.12126 |  |
|  | Abbé number νd |  | 16.37 |  |  | 16.58 |  |
|  | Liquidus temperature [° C.] |  | 1040 |  |  | 990 |  |
|  | Glass transition temperature [° C.] |  | 552 |  |  | 554.6 |  |
|  | Specific gravity |  | 5.41 |  |  | 5.56 |  |
|  | Viscosity at liquidus temperature [dPa · s] |  | 4.1 |  |  | 2.6 |  |
|  | λ5 [nm] |  | 426 |  |  | 427 |  |
|  | λ70 [nm] |  |  |  |  | 577 |  |

|  |  | No. | | | | | |
|---|---|---|---|---|---|---|---|
|  |  | 37 | | | 38 | | |
|  |  | cation % | mole % | mass % | cation % | mole % | mass % |
| Cation component (expressed in oxide) | $P^{5+}$ $(P_2O_5)$ | 22.47 | 18.517 | 11.166 | 28.19 | 24.255 | 15.278 |
|  | $Bi^{3+}$ $(Bi_2O_3)$ | 29.22 | 24.079 | 47.666 | 25.54 | 21.976 | 45.437 |
|  | $Nb^{5+}$ $(Nb_2O_5)$ | 23.03 | 18.978 | 21.431 | 23.94 | 20.599 | 24.296 |
|  | $Ti^{4+}$ $(TiO_2)$ | 12.64 | 20.832 | 7.070 | 11.97 | 20.599 | 7.301 |
|  | $W^{6+}$ $(WO_3)$ | 5.62 | 9.262 | 9.123 | 3.19 | 5.490 | 5.647 |
|  | $Li^+$ $(Li_2O)$ | 0.00 | 0.000 | 0.000 | 0.00 | 0.000 | 0.000 |
|  | $Na^+$ $(Na_2O)$ | 0.00 | 0.000 | 0.000 | 2.39 | 2.056 | 0.566 |
|  | $K^+$ $(K_2O)$ | 0.00 | 0.000 | 0.000 | 0.00 | 0.000 | 0.000 |
|  | $B^{3+}$ $(B_2O_3)$ | 3.93 | 3.239 | 0.958 | 3.72 | 3.201 | 0.989 |
|  | $Ba^{2+}$ $(BaO)$ | 1.97 | 3.247 | 2.115 | 0.00 | 0.000 | 0.000 |
|  | $Sr^{2+}$ $(SrO)$ | 0.00 | 0.000 | 0.000 | 0.00 | 0.000 | 0.000 |
|  | $Ca^{2+}$ $(CaO)$ | 0.00 | 0.000 | 0.000 | 0.00 | 0.000 | 0.000 |
|  | $Mg^{2+}$ $(MgO)$ | 0.00 | 0.000 | 0.000 | 0.00 | 0.000 | 0.000 |
|  | $Si^{4+}$ $(SiO_2)$ | 1.12 | 1.846 | 0.471 | 1.06 | 1.824 | 0.486 |
|  | $Zr^{4+}$ $(ZrO_2)$ | 0.00 | 0.000 | 0.000 | 0.00 | 0.000 | 0.000 |
|  | Total | 100.00 | 100.000 | 100.000 | 100.00 | 100.000 | 100.000 |
|  | $Sb_2O_3$ (Remarks 2) | — | — | 0.08 | — | — | 0.08 |
|  | $Bi^{3+} + Nb^{5+} + Ti^{4+} + W^{6+}$ $(Bi_2O_3 + Nb_2O_5 + TiO_2 + WO_3)$ | 70.51 | 73.151 | 85.290 | 64.64 | 68.664 | 82.681 |
|  | $Ti^{4+}/(Bi^{3+} + Nb^{5+} + Ti^{4+} + W^{6+})$ $(TiO_2/(Bi_2O_3 + Nb_2O_5 + TiO_2 + WO_3))$ | 0.179 | 0.285 | 0.083 | 0.185 | 0.300 | 0.088 |
|  | $Li^+ + Na^+ + K^+$ $(Li_2O + Na_2O + K_2O)$ | 0.00 | 0.000 | 0.000 | 2.39 | 2.056 | 0.566 |
|  | $Na^+/(Li^+ + Na^+ + K^+)$ $(Na_2O/(Li_2O + Na_2O + K_2O))$ | — | — | — | 1.000 | 1.000 | 1.000 |
|  | $R_2O + RO$ | 1.97 | 3.247 | 2.115 | 2.39 | 2.056 | 0.566 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ $(P_2O_5 + Bi_2O_3 + Nb_2O_5 + TiO_2 + WO_3 + Li_2O + Na_2O + K_2O + B_2O_3 + SiO_2 + BaO)$ | 100.00 | 100.000 | 100.000 | 100.00 | 100.000 | 100.000 |
|  | $P^{5+} + Bi^{3+} + Nb^{5+} + Ti^{4+} + W^{6+} + Li^+ + Na^+ + K^+ + Si^{4+} + B^{3+}$ $(P_2O_5 + Bi_2O_3 + Nb_2O_5 + TiO_2 + WO_3 + Li_2O + Na_2O + K_2O + SiO_2 + B_2O_3)$ | 98.03 | 96.753 | 97.885 | 100.00 | 100.000 | 100.000 |

TABLE 1-continued

| | | | |
|---|---|---|---|
| Anion component | $O^{2-}$ | 100 anion % | 100 anion % |
| | Refractive index nd | 2.16658 | 2.10204 |
| | Abbé number vd | 16.23 | 17.05 |
| | Liquidus temperature [° C.] | 1050 | 1010 |
| | Glass transition temperature [° C.] | 558.4 | 559 |
| | Specific gravity | 5.69 | 5.22 |
| | Viscosity at liquidus temperature [dPa·s] | 1.2 | 2 |
| | λ5 [nm] | 430 | 421 |
| | λ70 [nm] | | |

| | | No. 39 | | | No. 40 | | |
|---|---|---|---|---|---|---|---|
| | | cation % | mole % | mass % | cation % | mole % | mass % |
| Cation component (expressed in oxide) | $P^{5+}$ ($P_2O_5$) | 26.63 | 21.628 | 13.941 | 24.11 | 18.371 | 11.329 |
| | $Bi^{3+}$ ($Bi_2O_3$) | 26.12 | 21.213 | 44.886 | 23.22 | 17.693 | 35.818 |
| | $Nb^{5+}$ ($Nb_2O_5$) | 20.60 | 16.730 | 20.195 | 18.30 | 13.944 | 16.103 |
| | $Ti^{4+}$ ($TiO_2$) | 15.33 | 24.900 | 9.033 | 10.04 | 15.300 | 5.310 |
| | $W^{6+}$ ($WO_3$) | 5.03 | 8.170 | 8.602 | 18.75 | 28.574 | 28.781 |
| | $Li^+$ ($Li_2O$) | 0.00 | 0.000 | 0.000 | 0.00 | 0.000 | 0.000 |
| | $Na^+$ ($Na_2O$) | 0.00 | 0.000 | 0.000 | 0.00 | 0.000 | 0.000 |
| | $K^+$ ($K_2O$) | 0.00 | 0.000 | 0.000 | 0.00 | 0.000 | 0.000 |
| | $B^{3+}$ ($B_2O_3$) | 3.52 | 2.859 | 0.904 | 3.13 | 2.385 | 0.721 |
| | $Ba^{2+}$ (BaO) | 1.76 | 2.859 | 1.991 | 1.56 | 2.377 | 1.584 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 1.01 | 1.641 | 0.448 | 0.89 | 1.356 | 0.354 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.08 | — | — | 0.08 |
| | $Bi^{3+} + Nb^{5+} + Ti^{4+} + W^{6+}$ ($Bi_2O_3 + Nb_2O_5 + TiO_2 + WO_3$) | 67.08 | 71.013 | 82.716 | 70.31 | 75.511 | 86.012 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.229 | 0.351 | 0.109 | 0.143 | 0.203 | 0.062 |
| | $Li^+ + Na^+ + K^+$ ($Li_2O + Na_2O + K_2O$) | 0.00 | 0.000 | 0.000 | 0.00 | 0.000 | 0.000 |
| | $Na^+/(Li^+ + Na^+ + K^+)$ ($Na_2O/(Li_2O + Na_2O + K_2O)$) | — | — | — | — | — | — |
| | $R_2O + RO$ | 1.76 | 2.859 | 1.991 | 1.56 | 2.377 | 1.584 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 98.24 | 97.141 | 98.009 | 98.44 | 97.623 | 98.416 |
| Anion component | $O^{2-}$ | 100 anion % | | | 100 anion % | | |
| | Refractive index nd | | 2.12012 | | | 2.13211 | |
| | Abbé number vd | | 16.5 | | | 16.17 | |
| | Liquidus temperature [° C.] | | 1040 | | | 1020 | |
| | Glass transition temperature [° C.] | | 563 | | | 550 | |
| | Specific gravity | | 5.21 | | | 5.681 | |
| | Viscosity at liquidus temperature [dPa·s] | | 1.4 | | | 1.8 | |
| | λ5 [nm] | | 421 | | | 455 | |
| | λ70 [nm] | | | | | | |

TABLE 1-continued

| | | No. 41 | | | No. 42 | | |
|---|---|---|---|---|---|---|---|
| | | cation % | mole % | mass % | cation % | mole % | mass % |
| Cation component (expressed in oxide) | $P^{5+}$ ($P_2O_5$) | 27.48 | 22.592 | 12.977 | 24.49 | 18.815 | 11.731 |
| | $Bi^{3+}$ ($Bi_2O_3$) | 26.46 | 21.755 | 41.016 | 23.59 | 18.124 | 37.094 |
| | $Nb^{5+}$ ($Nb_2O_5$) | 20.87 | 17.159 | 18.455 | 18.59 | 14.282 | 16.676 |
| | $Ti^{4+}$ ($TiO_2$) | 3.31 | 5.443 | 1.759 | 10.20 | 15.673 | 5.499 |
| | $W^{6+}$ ($WO_3$) | 13.23 | 21.755 | 20.408 | 15.42 | 23.695 | 24.129 |
| | $Li^+$ ($Li_2O$) | 0.00 | 0.000 | 0.000 | 0.00 | 0.000 | 0.000 |
| | $Na^+$ ($Na_2O$) | 0.00 | 0.000 | 0.000 | 0.00 | 0.000 | 0.000 |
| | $K^+$ ($K_2O$) | 0.00 | 0.000 | 0.000 | 0.00 | 0.000 | 0.000 |
| | $B^{3+}$ ($B_2O_3$) | 3.56 | 2.927 | 0.825 | 3.17 | 2.435 | 0.745 |
| | $Ba^{2+}$ (BaO) | 4.07 | 6.692 | 4.152 | 3.63 | 5.578 | 3.757 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (MgO) | 0.00 | 0.000 | 0.000 | 0.00 | 0.000 | 0.000 |
| | $Si^{4+}$ ($SiO_2$) | 1.02 | 1.677 | 0.408 | 0.91 | 1.398 | 0.369 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Remarks 2) | — | — | 0.08 | — | — | 0.08 |
| | $Bi^{3+} + Nb^{5+} + Ti^{4+} + W^{6+}$ ($Bi_2O_3 + Nb_2O_5 + TiO_2 + WO_3$) | 63.87 | 66.112 | 81.638 | 67.80 | 71.774 | 83.398 |
| | $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.052 | 0.082 | 0.022 | 0.150 | 0.218 | 0.066 |
| | $Li^+ + Na^+ + K^+$ ($Li_2O + Na_2O + K_2O$) | 0.00 | 0.000 | 0.000 | 0.00 | 0.000 | 0.000 |
| | $Na^+/(Li^+ + Na^+ + K^+)$ ($Na_2O/(Li_2O + Na_2O + K_2O)$) | — | — | — | — | — | — |
| | $R_2O + RO$ | 4.07 | 6.692 | 4.152 | 3.63 | 5.578 | 3.757 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 95.93 | 93.308 | 95.848 | 96.37 | 94.422 | 96.243 |
| Anion component | $O^{2-}$ | | 100 anion % | | | 100 anion % | |
| | Refractive index nd | | 2.08103 | | | 2.12016 | |
| | Abbé number vd | | 17.74 | | | 16.62 | |
| | Liquidus temperature [° C.] | | 980 | | | 990 | |
| | Glass transition temperature [° C.] | | 552 | | | 559 | |
| | Specific gravity | | 5.7 | | | 5.66 | |
| | Viscosity at liquidus temperature [dPa · s] | | 2.8 | | | 2.6 | |
| | λ5 [nm] | | 427 | | | 439 | |
| | λ70 [nm] | | 615 | | | | |

| | | No. 43 | | | No. 44 | | |
|---|---|---|---|---|---|---|---|
| | | cation % | mole % | mass % | cation % | mole % | mass % |
| Cation component (expressed in oxide) | $P^{5+}$ ($P_2O_5$) | 19.46 | 16.124 | 10.546 | 27.48 | 21.513 | 13.547 |
| | $Bi^{3+}$ ($Bi_2O_3$) | 25.31 | 20.974 | 45.028 | 26.46 | 20.714 | 42.818 |
| | $Nb^{5+}$ ($Nb_2O_5$) | 19.95 | 16.531 | 20.246 | 14.76 | 11.555 | 13.625 |
| | $Ti^{4+}$ ($TiO_2$) | 10.95 | 18.147 | 6.679 | 11.45 | 17.926 | 6.353 |

TABLE 1-continued

| | | | | | | |
|---|---|---|---|---|---|---|
| $W^{6+}$ ($WO_3$) | 4.87 | 8.071 | 8.621 | 11.20 | 17.536 | 18.036 |
| $Li^+$ ($Li_2O$) | 0.00 | 0.000 | 0.000 | 0.00 | 0.000 | 0.000 |
| $Na^+$ ($Na_2O$) | 0.00 | 0.000 | 0.000 | 0.00 | 0.000 | 0.000 |
| $K^+$ ($K_2O$) | 0.00 | 0.000 | 0.000 | 0.00 | 0.000 | 0.000 |
| $B^{3+}$ ($B_2O_3$) | 14.60 | 12.098 | 3.881 | 3.56 | 2.787 | 0.861 |
| $Ba^{2+}$ (BaO) | 3.89 | 6.447 | 4.554 | 4.07 | 6.372 | 4.334 |
| $Sr^{2+}$ (SrO) | 0.00 | 0.000 | 0.000 | 0.00 | 0.000 | 0.000 |
| $Ca^{2+}$ (CaO) | 0.00 | 0.000 | 0.000 | 0.00 | 0.000 | 0.000 |
| $Mg^{2+}$ (MgO) | 0.00 | 0.000 | 0.000 | 0.00 | 0.000 | 0.000 |
| $Si^{4+}$ ($SiO_2$) | 0.97 | 1.608 | 0.445 | 1.02 | 1.597 | 0.426 |
| $Zr^{4+}$ ($ZrO_2$) | 0.00 | 0.000 | 0.000 | 0.00 | 0.000 | 0.000 |
| Total | 100.00 | 100.000 | 100.000 | 100.00 | 100.000 | 100.000 |
| $Sb_2O_3$ (Remarks 2) | — | — | 0.08 | — | — | 0.08 |
| $Bi^{3+} + Nb^{5+} + Ti^{4+} + W^{6+}$ ($Bi_2O_3 + Nb_2O_5 + TiO_2 + WO_3$) | 61.08 | 63.723 | 80.574 | 63.87 | 67.731 | 80.832 |
| $Ti^{4+}/(Bi^{3+} + Nb^{5+} + Ti^{4+} + W^{6+})$ ($TiO_2/(Bi_2O_3 + Nb_2O_5 + TiO_2 + WO_3)$) | 0.179 | 0.285 | 0.083 | 0.179 | 0.265 | 0.079 |
| $Li^+ + Na^+ + K^+$ ($Li_2O + Na_2O + K_2O$) | 0.00 | 0.000 | 0.000 | 0.00 | 0.000 | 0.000 |
| $Na^+/(Li^+ + Na^+ + K^+)$ ($Na_2O/(Li_2O + Na_2O + K_2O)$) | — | — | — | — | — | — |
| $R_2O + RO$ | 3.89 | 6.447 | 4.554 | 4.07 | 6.372 | 4.334 |
| $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.000 | 100.000 | 100.00 | 100.000 | 100.000 |
| $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 96.11 | 93.553 | 95.446 | 95.93 | 93.628 | 95.666 |
| Anion component $O^{2-}$ | | 100 anion % | | | 100 anion % | |
| Refractive index nd | | 2.11198 | | | 2.09439 | |
| Abbé number vd | | 17.21 | | | 17.3 | |
| Liquidus temperature [° C.] | | 1040 | | | 980 | |
| Glass transition temperature [° C.] | | 543.8 | | | 556 | |
| Specific gravity | | 5.48 | | | 5.63 | |
| Viscosity at liquidus temperature [dPa·s] | | 1.2 | | | 2.8 | |
| λ5 [nm] | | 421 | | | 431 | |
| λ70 [nm] | | 541 | | | 648 | |

(Remarks 1) Content, total content and content ratio in mole % or mass %: based on oxides
(Remarks 2) Sb2O3 content is in mass % based on the total amount of the glass components Comparative Example When 300 g glass blocks comprised of the optical glass of Embodiment 13 in Patent Reference 1 were prepared, crystals precipitated on the surface of the glass blocks. Although the refractive index nd was 2.03 in Embodiment 13 of Patent Reference 1, the observation of the precipitation of crystals on the surface made it difficult to raise the refractive index to more than 2.05.

FIG. 1 shows the relation between temperature and viscosity in optical glass no. 24, optical glass no. 32, and Embodiment 13 of Patent Reference 1 above, with the glass temperature plotted on the x-axis and viscosity on the y-axis. As is clear from FIG. 1, a comparison of optical glass no. 24, optical glass no. 32, and Embodiment 12 of Patent Reference 1 reveals that high viscosity was exhibited at all temperatures. It became difficult to manufacture a high-quality optical glass because the liquidus temperature rose and the viscosity during glass manufacturing dropped when the refractive index was raised using the composition of Embodiment 12 in Patent Reference 1 as a base. By contrast, it will be understood that both optical glass nos. 24 and 32 maintained viscosities that permitted the molding of high-quality optical glass even at high temperatures.

When Embodiments 3 and 7 of Patent Reference 2 were reproduced, the refractive index (nd) of Embodiment 3 was 2.017, the Abbe number was 19.3, the viscosity at the liquidus temperature of 960° C. was 2.0 dPa-s, and the viscosity at 1,000° C. was 1.2 dPa-s. The refractive index (nd) of Embodiment 7 was 2.014, the Abbe number was 18.7, the viscosity at the liquidus temperature (LT) was 2.0 dPa-s, and the viscosity at 1,000° C. was 1.3 dPa-s. In neither case was it possible to obtain the Abbe number stated in the specification (16.2 for both Embodiments 3 and 7). (Due to marked volatility during glass manufacturing, such as marked volatility when the glasses were melted and the adhesion of volatile matter of high K2O concentration to the crucible wall and cover, it was difficult to obtain homogeneous optical glasses.)

Embodiment 2

In the same manner as in Embodiment 1, glass starting materials were heated, melted, clarified, and homogenized to obtain optical glass nos. 1 to 44. Each of the glass melts obtained was made to flow into a casting mold, rapidly cooled, and molded into a glass block. The glass block was annealed, cut, and ground to prepare a glass material for press molding.

Embodiment 3

Each of the glass materials for press molding prepared in Embodiment 2 was softened by heating and press molded by a known method with a pressing mold to prepare optical element blanks such as lens blanks and prism blanks.

Each of the optical element blanks obtained was precision annealed and the refractive index thereof was precisely adjusted to yield the desired refractive index. Subsequently, known grinding and polishing methods were used to finish a lens or a prism.

Next, the surfaces of the glass materials for press molding that had been prepared in Embodiment 2 were polished to obtain glass materials for precision press molding. Each of the glass materials was heated and precision press molded to obtain an aspherical lens. The precision press molding was conducted by a known method.

As a result, various lenses and prisms were prepared.

When the lens obtained was used to constitute an image pickup optical system, an image pickup device affording good color reproducing properties was obtained.

When the lenses obtained were used to fabricate portable telephone-mounted image pickup units and optical pickup units, units with extremely little focus position shift due to vibration were obtained.

The optical element of the present embodiment permits good correction of chromatic aberration when combined with an optical element made of low dispersion glass. It is also effective for enhancing the functionality and compactness of various optical equipment including image pickup devices.

What is claimed is:

1. An optical glass in the form of an oxide glass, characterized: by comprising, denoted as cationic percentages,
16 to 35% of $P^{5+}$,
14 to 35% of $Bi^{3+}$,
10 to 33% of $Nb^{5+}$,
0 to 18% of $Ti^{4+}$, and
0 to 20% of $W^{6+}$;
in that the total content of $Bi^{3+}$, $Nb^{5+}$, $Ti^{4+}$, and $W^{6+}$ is 55% or higher; the refractive index nd exceeds 2.05; and
the Abbe number vd is 18.5 or lower.

2. The optical glass according to claim 1, wherein the viscosity at the liquidus temperature is 1.0 dPa's or greater.

3. The optical glass according to claim 1, wherein the glass comprises at least one alkali metal component from among $Li^+$, $Na^+$, and $K^+$;
the content of $Li^+$ being 7 cation % or lower,
the content of $Na^+$ being 20 cation % or lower,
the content of $K^+$ being 10 cation % or lower, and
the ratio of the content of $Na^+$ to the total content of $Li^+$, $Na^+$, and $K^+$ ($Na^+/(Li^++Na^++K^+)$) being 0.2 to 1.

4. The optical glass according to claim 1, wherein the content of $B^{3+}$ is 0 to 20 cation %.

5. The optical glass of claim 1, wherein the total content of $P^{5+}$, $Bi^{3+}$, $Nb^{5+}$, $Ti^{4+}$, $W^{6+}$, $Li^+$, $Na^+$, $K^+$, $Ba^{2+}$, $Si^{4+}$, and $B^{3+}$ is 90 cation % or greater.

6. The optical glass of claim 1, wherein the liquidus temperature is 940° C. or higher.

7. The optical glass according to claim 2, wherein the glass comprises at least one alkali metal component from among $Li^+$, $Na^+$, and $K^+$;
the content of $Li^+$ being 7 cation % or lower,
the content of $Na^+$ being 20 cation % or lower,
the content of $K^+$ being 10 cation % or lower, and
the ratio of the content of $Na^+$ to the total content of $Li^+$, $Na^+$, and $K^+$ ($Na^+/(Li^++Na^++K^+)$) being 0.2 to 1.

8. The optical glass according to claim 1, wherein the total content of $Bi^{3+}$, $Nb^{5+}$, $Ti^{4+}$ and $W^{+6}$ is 58% or higher.

9. A glass material for molding comprised of the optical glass according to claim 1.

10. An optical element comprised of the optical glass according to claim 1.

* * * * *